(12) United States Patent
Wookey

(10) Patent No.: US 7,428,756 B2
(45) Date of Patent: Sep. 23, 2008

(54) ACCESS CONTROL OVER DYNAMIC INTELLECTUAL CAPITAL CONTENT

(75) Inventor: Michael J. Wookey, Los Gatos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 1016 days.

(21) Appl. No.: 10/691,283

(22) Filed: Oct. 22, 2003

(65) Prior Publication Data

US 2004/0230442 A1 Nov. 18, 2004

Related U.S. Application Data

(60) Provisional application No. 60/469,767, filed on May 12, 2003.

(51) Int. Cl.
*H04L 9/32* (2006.01)
(52) U.S. Cl. .......................................... 726/26; 726/27
(58) Field of Classification Search ............. 726/26–30, 726/1–2; 713/161, 168
See application file for complete search history.

(56) References Cited

U.S. PATENT DOCUMENTS 5,903,882 A * 5/1999 Asay et al. .................... 705/44
6,732,331 B1 * 5/2004 Alexander .................. 715/513

* cited by examiner

*Primary Examiner*—Hosuk Song
(74) *Attorney, Agent, or Firm*—Sonnenschein Nath & Rosenthal LLP

(57) ABSTRACT

Methods, systems, and articles of manufacture consistent with the present invention provide for access control over dynamic intellectual capital content. A subscriber subscribes to a datatype, the datatype having a predetermined runtime property that restricts use of the datatype. The datatype is associated with a data referenced in the datatype and maintained separate from the datatype. The datatype is received responsive to the subscription. A determination is made whether the runtime properties are valid. If the runtime properties are valid, a determination is made whether a user of the subscriber has permission to access the data referenced in the datatype. If the user has permission to access the data, the user is provided access to the data.

10 Claims, 26 Drawing Sheets

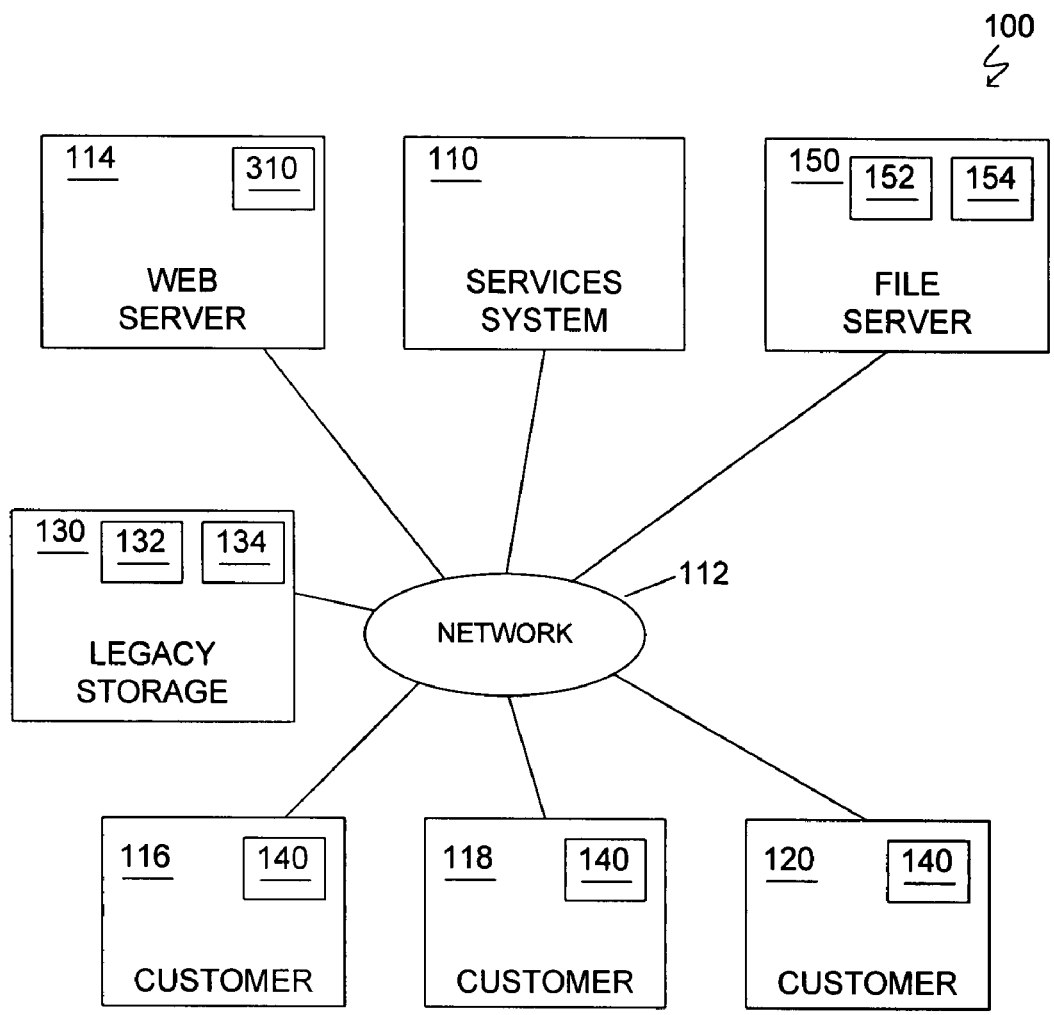

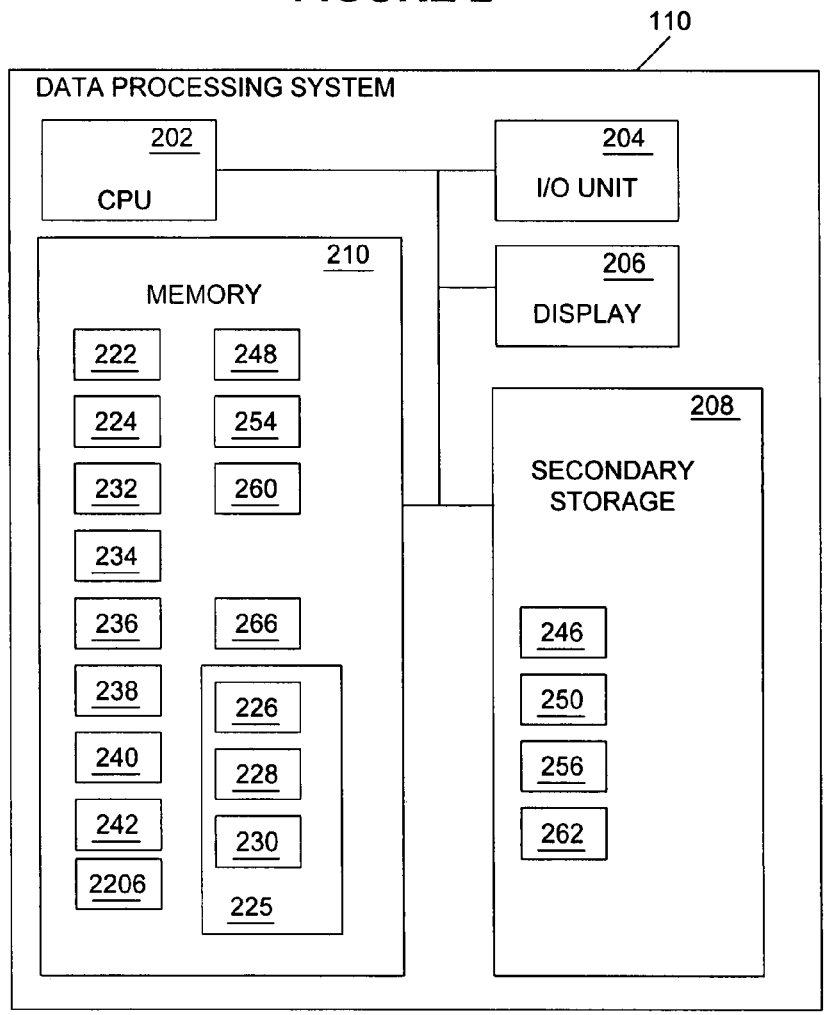

FIGURE 2

LEGEND

222 - REGISTRATION BLOCK
224 - BUS MANAGER
225 - STORAGE CONTROLLER
226 - LEGACY STORAGE CONTROLLER
228 - CORE STORAGE CONTROLLER
230 - TEMP. STORAGE CONTROLLER
232 - COMMON SERVICES BLOCK
234 - TRANSFORMER BLOCK
236 - PRESENTER BLOCK
238 - EXTERNAL DATA INPUT MGR.
240 - REGISTRY
242 - VIRTUAL DATABASE
246 - LISTS
248 - PROPERTIES RDBMS
250 - PROPERTIES DATABASE
254 - MESSAGE BROKER CLUSTER
256 - MESSAGE QUEUE REPOSITORY
260 - CLIENT MODULE
262 - LOCAL FILE SYSTEM
266 - MESSAGE QUEUE RDBMS
2206 - DATATYPE MAPPING EDITOR

RELATIONSHIPS BETWEEN INTELLECTUAL CAPITAL
APPLICATIONS AND OTHER FUNCTIONAL COMPONENTS

ACCESS CONTROL OVER DYNAMIC INTELLECTUAL CAPITAL CONTENT

CROSS-REFERENCE TO RELATED APPLICATIONS

This application claims the benefit of the filing date and priority to the following patent application, which is incorporated herein by reference to the extent permitted by law:

U.S. Provisional Application Ser. No. 60/469,767, entitled "METHODS AND SYSTEMS FOR INTELLECTUAL CAPITAL SHARING AND CONTROL", filed May 12, 2003.

Additionally, this application is related to the following U.S. patent applications, which are filed concurrently with this application, and which are incorporated herein by reference to the extent permitted by law:

Ser. No. 10/691,075, entitled "INTELLECTUAL CAPITAL SHARING";

Ser. No. 10/691,098, entitled "INTEGRATING INTELLECTUAL CAPITAL THROUGH ABSTRACTION";

Ser. No. 10/690,869, entitled "EVOLUTIONARY DEVELOPMENT OF INTELLECTUAL CAPITAL IN AN INTELLECTUAL CAPITAL MANAGEMENT SYSTEM";

Ser. No. 10/691,097, entitled "BUSINESS INTELLIGENCE USING INTELLECTUAL CAPITAL";

Ser. No. 10/690,865, entitled "INTEGRATING INTELLECTUAL CAPITAL INTO AN INTELLECTUAL CAPITAL MANAGEMENT SYSTEM";

Ser. No. 10/691,039, entitled "METHODS AND SYSTEMS FOR PUBLISHING AND SUBSCRIBING TO INTELLECTUAL CAPITAL";

Ser. No. 10/690,867, entitled "A LOOSELY COUPLED INTELLECTUAL CAPITAL PROCESSING ENGINE";

Ser. No. 10/691,279, entitled "ASYNCHRONOUS INTELLECTUAL CAPITAL QUERY SYSTEM";

Ser. No. 10/690,870, entitled "ASSEMBLY OF BUSINESS PROCESS USING INTELLECTUAL CAPITAL PROCESSING";

Ser. No. 10/690,870, entitled "REGISTRATION AND CONTROL OF INTELLECTUAL CAPITAL"; and Ser. No. 10/691,280, entitled "ENABLING ACTIVE INTELLECTUAL CAPITAL PROCESSING TO ENABLE DATA NEUTRALITY."

FIELD OF THE INVENTION

The present invention relates to servicing computer-based systems, and in particular, to a distributed message-oriented system to capture, share and manage structured and unstructured knowledge about serviced computer-based systems.

BACKGROUND OF THE INVENTION

Corporations have made a significant shift toward increased globalization in the recent past. This is driven by many factors, from the need to be closer to global customers to workforce cost management. Communications technology has broken down many of the traditional barriers. As the corporations spread across the globe, they implement computer-based systems in each of their new locations. These systems typically require support by services organizations, which must accommodate for the growth of the corporations.

In the computer support services industry, knowledge is conventionally maintained by individual experts that are distributed globally in the service field. The geographically diverse experts use multiple information systems and a variety of analysis tools, making knowledge sharing very difficult.

The lifeblood of a services industry is the knowledge that it maintains. Support is offered on products based on the knowledge of the services engineers and the knowledge bases that support those services engineers. Knowledge is used to build training classes that are offered globally to customers to increase their effectiveness at operating their systems. Further, best practice architectures are built based on the knowledge and experience of architects and are offered as solutions to businesses.

The services industry has conventionally been a people intensive industry. As one would expect, the number of people required to service a technology is traditionally directly related to the complexity and market penetration of that technology. As technology complexity and product deployment has increased, as has the number of people employed by services organizations. In some industry examples, services organizations have outgrown the size of product development groups in the same technology corporation. Research into these cases reveals highly labor-intensive process-driven businesses with little direct implementation of technology to support the process.

Collecting and automating knowledge, such as by using decision trees, is not a new technology. In the 1980s, research was put into this by the expert system community. The focus of the research was on how the experts could be encouraged to divulge their knowledge into a computer system, and more importantly on how the knowledge could be refreshed and maintained. Experts, such as services engineers, are generally business critical and have not typically had the time to impart their knowledge. Even if they were allowed to do so, it was difficult to justify the ongoing knowledge refresh that the support system required. Additionally, under those conditions, the experts did not typically engage with the knowledge capture process.

The effect of automating knowledge of a subject matter expert had a direct and clear value to a business. This led to the growth of a cottage industry of software tools makers in the services industry. The vast majority of those tools were created in the spare time of the services engineers (the expert) with the subject matter expertise, and their requirements were usually founded in personal experience of repeated problems or customer concerns. This process grew and evolved through the 1990s as the services industry's tools space became globalized.

Much of the above issues apply to structured knowledge, but unstructured knowledge faces similar problems. Unstructured knowledge is conventionally gathered globally as documents into repositories. The large centralized repositories typically have little knowledgeable connections between their various documents and there is typically no concept of aging for the data. Efforts have been focused on creating meta data standards for documentation, which has improved some of the knowledge, however there is currently no single meta data standard for much of the knowledge.

Knowledge management is a technology that has held promise for many years now, often seen as a method of productivity increase based on the ability to capture knowledge for multi-purpose reuse. The services industry has segmented the knowledge management technology into structured and unstructured management systems. Structured knowledge systems focus on the application of well formatted data to problems or opportunities, while unstructured management systems focus on applications and creation of meta data systems and building or associating ontologies with them. Conventional knowledge management technologies, however, still suffer from the above-described problems.

SUMMARY OF THE INVENTION

Methods, systems, and articles of manufacture consistent with the present invention provide for the distributed data-centric capture, sharing and managing of intellectual capital. For purposes of this disclosure, "intellectual capital" refers to a subset of knowledge that is useful and valuable to a services organization for servicing computer-based systems. The terms intellectual capital, knowledge, and data are used interchangeably for purposes of this disclosure. A distributed system enables the sharing of structured and unstructured knowledge using a publish and subscribe pattern. An evolving ontology of knowledge types is maintained within the system and the storage of the knowledge that flows through the system is implicit and maintained according to a defined time of relevance for each knowledge type.

The knowledge is published and subscribed to over the Internet. Therefore, a services engineer who is at a customer site anywhere in the world can publish newly acquired knowledge provided that they have Internet access. The system associates the data with a datatype that has a format that is readable by other users of the system, then shares the datatype with relevant subscribers on the system. Upon receiving the datatype, the subscribers can also access the data, which is maintained separately from the datatype. Thus, newly acquired knowledge is almost instantaneously and asynchronously received by other services engineers, who may be confronted with an issue that requires the newly acquired knowledge.

In accordance with methods consistent with the present invention, a method in a data processing system having a program is provided. The method comprises the steps of: a subscriber subscribing to a datatype, the datatype having a predetermined runtime property that restricts use of the datatype, the datatype being associated with a data referenced in the datatype and maintained separate from the datatype; receiving the datatype responsive to the subscription; determining whether the runtime properties are valid; if the runtime properties are valid, determining whether a user of the subscriber has permission to access the data referenced in the datatype; and if the user has permission to access the data, providing the user access to the data.

In accordance with articles of manufacture consistent with the present invention, a computer-readable medium containing instructions that cause a program in a data processing medium to perform a method is provided. The method comprises the steps of: a subscriber subscribing to a datatype, the datatype having a predetermined runtime property that restricts use of the datatype, the datatype being associated with a data referenced in the datatype and maintained separate from the datatype; receiving the datatype responsive to the subscription; determining whether the runtime properties are valid; if the runtime properties are valid, determining whether a user of the subscriber has permission to access the data referenced in the datatype; and if the user has permission to access the data, providing the user access to the data.

In accordance with systems consistent with the present invention, a data processing system is provided. The data processing system comprises: a memory having a program that subscribes a subscriber to a datatype, the datatype having a predetermined runtime property that restricts use of the datatype, the datatype being associated with a data referenced in the datatype and maintained separate from the datatype, receiving the datatype responsive to the subscription, determines whether the runtime properties are valid, determines whether a user of the subscriber has permission to access the data referenced in the datatype if the runtime properties are valid, and provides the user access to the data if the user has permission to access the data; and a processing unit that runs the program.

In accordance with systems consistent with the present invention, a data processing system is provide. The data processing system comprises: means for subscribing a subscriber to a datatype, the datatype having a predetermined runtime property that restricts use of the datatype, the datatype being associated with a data referenced in the datatype and maintained separate from the datatype; means for receiving the datatype responsive to the subscription; means for determining whether the runtime properties are valid; means for determining whether a user of the subscriber has permission to access the data referenced in the datatype if the runtime properties are valid; and means for providing the user access to the data if the user has permission to access the data.

Other systems, methods, features, and advantages of the invention will become apparent to one with skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings, FIG. 1 shows a block diagram illustrating a data processing system in accordance with methods and systems consistent with the present invention;

FIG. 2 shows a block diagram of a services data processing system in accordance with methods and systems consistent with the present invention;

DETAILED DESCRIPTION OF THE INVENTION

Figure 3:
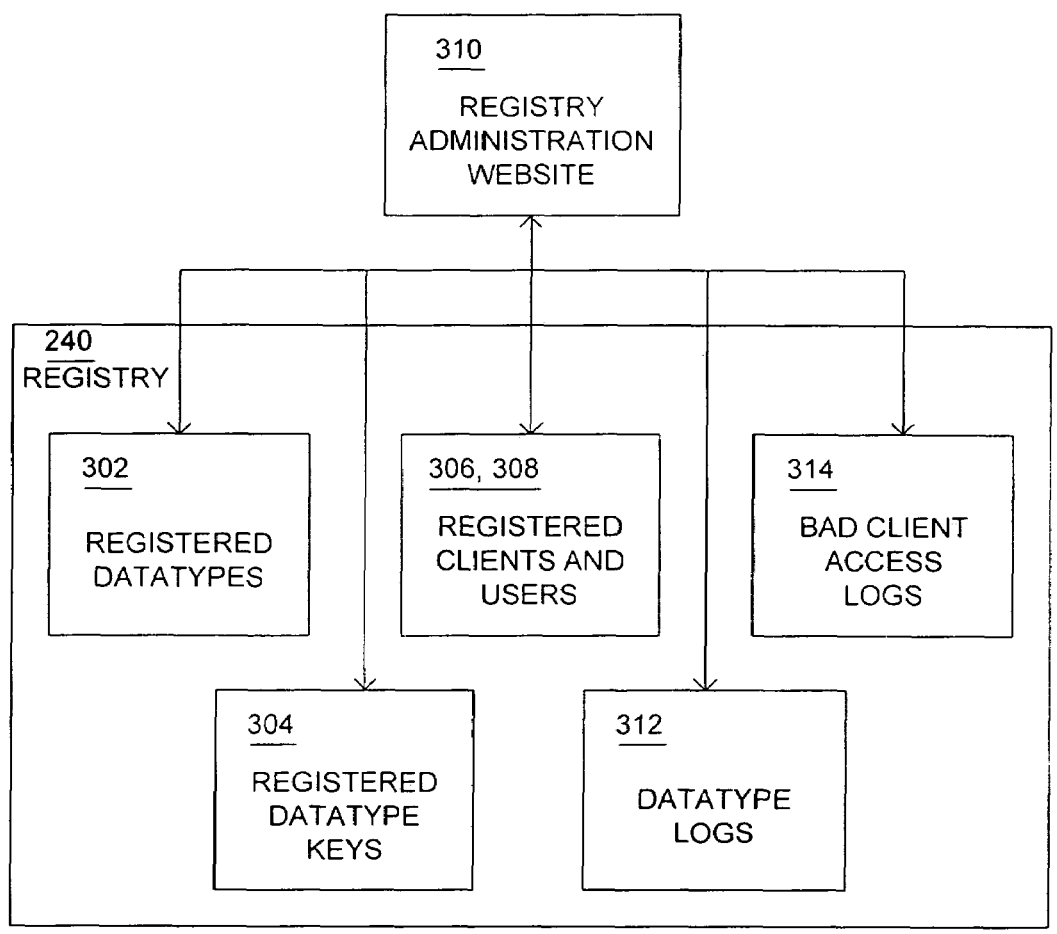
FIG. 3 depicts a block diagram of a high level functional view of the registry and the registration administration website.

Reference will now be made in detail to an implementation consistent with the present invention as illustrated in the accompanying drawings. Wherever possible, the same reference numbers will be used throughout the drawings and the following description to refer to the same or like parts.

Methods, systems, and articles of manufacture consistent with the present invention provide for the distributed datacentric capture, sharing and managing of intellectual capital. A distributed services system ("the system") enables the sharing of structured and unstructured knowledge using a publish and subscribe pattern. An evolving ontology of knowledge datatypes is registered and maintained within the system and the storage of the knowledge that flows through the system is implicit and maintained according to a defined time of relevance for each knowledge type. The knowledge is asynchronously published and subscribed to over a network, such as the Internet, and also allows synchronous controlled access to requested knowledge.

As will be described in more detail below, the system treats both structured and unstructured knowledge as artifacts. The knowledge data is associated with meta data that is in a format that can be recognized by any functional block of the system. Thus, the knowledge data itself does not have to be in a globally recognizable format. A description of each meta data is registered within its knowledge ontology. Relationships between the meta data are explicitly set within the ontology to provide deterministic joining of the knowledge instances. Over time, more information can be driven into the meta data, so that knowledge processors know less and less about the original format of the knowledge.

The system can evolve its ontology to adopt new knowledge or remove no longer applicable knowledge. It provides a method for evolving knowledge and data from a less structured model to a highly structured model, while insulating tools and knowledge processors from the same change timeline. The system also tracks the use of the datatypes and tools under its control, providing business intelligence focused on which tools are important and what knowledge is key to the success of the business. This provides an indicator for focused evolution of the toolset toward the core business requirements. The datatype lifecycle is managed within the system using a time of relevance concept. A time is associated with each datatype that describes for how long this datatype is considered relevant, from its time of creation/collection. A storage system uses this time relevance when tools/knowledge processors query for information or request multiple subscriptions for datatypes. A garbage collection function uses this to remove aged data within the storage devices.

FIG. 1 depicts a block diagram of a data processing system 100 suitable for use with methods and systems consistent with the present invention. Data processing system 100 is referred to hereinafter as "the system." The system is an infrastructure that enables the services organization to share and leverage intellectual capital and data. The system comprises a services system 110 ("the services system") connected to a network 112. The network is any network suitable for use with methods and systems consistent with the present invention, such as a Local Area Network or Wide Area Network. In the illustrative embodiment, the network is the Internet. Intellectual capital and data are transmitted via the network using a publish and subscribe messaging system that is controlled by a bus manager 224 residing on services system 110. Knowledge processing engines, or clients 234, 236 and 238, also reside on services system 110 and receive the published information through subscription, process the received information, and in turn publish a result. One type of client, a presenter 236, presents its processing result in the form of webpage information that can be viewed by customer systems 116, 118 and 120 running web browsers 140. Customers and services engineers at the customer systems can therefore view intellectual capital that is asynchronously receive by a presenter and presented to the customer system. Further, new intellectual capital can be provided into the system via the web browser, which intellectual capital is asynchronously subscribed to by a client on the system for processing and possible publication to be viewed by other users. A web server 114 provides an interface through which an administrator can maintain a registry of clients, users, datatypes, and datatype keys on the system.

Additional devices can also be connected to the network as part of the system. In the depicted example, a legacy storage system 130, which has a legacy data storage device 132, is connected to the network. The system can access intellectual capital and data stored on the legacy storage system. Intellectual capital data is also stored on a file server 150 connected to the network. File server 150 includes a file manager program 152 and a file storage 154. Each of these components of the system will be described in more detail below.

FIG. 2 depicts a more detailed view of services system 110. Services system 110 is, for example, a Sun® SPARC® data processing system running the Solaris® operating system. One having skill in the art will appreciate that devices and programs other than those described in the illustrative examples can be implemented. Sun, Java, and Solaris and are trademarks or registered trademarks of Sun Microsystems, Inc., Palo Alto, Calif., in the United States and other countries. SPARC is a registered trademark of SPARC International, Inc., in the United States and other countries. Other names may be trademarks or registered trademarks of their respective owners. The services system comprises a central processing unit (CPU) 202, an input/output (I/O) unit 204, a display device 206, a secondary storage device 208, and a memory 210. The services system may further comprise standard input devices such as a keyboard, a mouse or a speech processing means (each not illustrated).

Memory 210 comprises a number of functional modules that administer, register, store, and distribute the intellectual capital and data, including: a registration block 222, bus manager 224, a storage controller 225, a common services block 232, a transformer block 234, a presenter block 236, an external data input manager 238, a message broker cluster 254, a virtual database 242, a registry 240, a message queue relational database management system (RDBMS) 266, a properties RDBMS 248, and a client module 260. As will be described in more detail below, there may be multiple instances of some of these modules on the system, such as multiple client modules and storage controllers. Some of these functional modules will be described briefly immediately below and then each will be described in more detail further down in the description. One of skill in the art will appreciate that each functional modules can itself be a stand-alone program and can reside in memory on a data processing other than the services system. The functional modules may comprise or may be included in one or more code sections containing instructions for performing their respective operations. While the functional modules are described as being implemented as software, the present implementation may be implemented as a combination of hardware and software or hardware alone. Also, one having skill in the art will appreciate that the functional modules may comprise or may be included in a data processing device, which may be a client or a server, communicating with services system 110.

The system maintains data with associated datatypes, which are classes. A datatype contains metadata about the data and the body of the data itself. The metadata describes the data and is implemented in the properties of a message envelope that is used to transmit the datatype through the messaging system. The message can either contain the body of the data or a reference, such as a pointer, to the data. Therefore, clients of the system, such as processing engines, do not have to understand the body of the data itself, they at a minimum need to understand the metadata. Accordingly, clients are able to share and process datatypes even if the body of the data is in an unfamiliar format, such as legacy data. Over time, the body of the data can be manipulated into a standard format or moved into the metadata, leaving a null body. Thus, the data can evolve into a standard format that is recognizable by clients of the system.

The system abstracts the data, as described above, and registers the datatype and any clients that consumer/produce data. Once the registration is complete, the data can be tracked from initial entry into the system, including who uses the data, what additional data is generated from it, and what data is used to solve customer problems. Given this information, the metrics of the business can be accurately measured.

Registration block 222 controls a Lightweight Directory Access Protocol (LDAP) registry 240 that stores known datatypes, datatype keys, clients, and users within the system. The datatypes have information associated with them, such as how they should be stored, what storage controller they should be sent to, the priority of the data to the system, the version of the datatype, and envelope data that is added in to incoming data instances. The registry is updated and maintained by an administrator, who acts through an interface of the web server 114.

Bus manager 224 controls the publishing and subscribing of messages. Bus manager 224 can be any publish/subscribe messaging program suitable for use with methods and systems consistent with the present invention. In the illustrative example, bus manager 224 is built around a multi-broker implementation of the Sun® ONE Messaging Queue (S1MQ) implementation of the Java® Messaging System (JMS). Part of the act of registering a new datatype with the registry is to create a new topic for that datatype within the system. The system carries references (pass by reference) to data that is stored by the storage controllers. Thus, messages passed through the system do not carry the data itself, but instead have a meta data that is in a neutral format that is readable by subscribers. Accordingly, the data itself does not have to be converted to a universally readable format, unless that is desired.

Storage controller 225 can be implemented as one or more legacy storage controllers, core storage controllers, and temporary storage controllers 230. Legacy storage controller 226 provides a transparent interaction with existing repositories. Existing repositories are registered with the legacy storage controller to describe what datatypes are supported and how they can be saved. Core storage controller 228 and temporary storage controller 230 are similar in that they store datatypes that are newly registered with the system. The core storage controller manages the storing, retrieving and querying of documents that contain intellectual capital and data that are stored in a virtualized database 242. The temporary storage controller maintains the storage of data that has been flagged in the datatype registry as temporary. This can apply, for example, to external data that is to be parsed by the transformer block, or interim transformer data that may be persisted for transactional recovery purposes.

Common services block 232 provides for incorporating functionality that is common to consumers/producers of data and intellectual capital within the system. For example, the common services block manages the lifecycle of data and intellectual capital.

Transformer block 234, presenter block 236 and external data input manager 238 are registered as clients on the system. These clients are loosely coupled processing engines that asynchronously receive data, processes it, and possibly publish it. Transformer block 234 takes data to which it has subscribed, applies a transformation onto the data into one or more output datatypes, and publishes the datatype. Presenter block 236 queries data from storage and present it to a user. External data input manager 238 formats incoming external data into a format that the system can understand and publish it onto the system. This involves associating the incoming data with a known datatype and applying an envelope to the particular instance of the data. There can be a plurality of transformer block and presenter block instances, each configured to process one or more datatypes.

Each of the above-described functional blocks will be described in more detail below.

Although aspects of methods, systems, and articles of manufacture consistent with the present invention are depicted as being stored in memory, one having skill in the art will appreciate that these aspects may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of the data processing system 100 have been described, one skilled in the art will appreciate that a data processing system suitable for use with methods, systems, and articles of manufacture consistent with the present invention may contain additional or different components.

One having skill in the art will appreciate that the services system 10 can itself also be implemented as a client-server data processing system. In that case, the functional modules can be stored on the services system as a client, while some or all of the steps of the processing of the functional blocks described below can be carried out on a remote server, which is accessed by the server over the network. The remote server can comprise components similar to those described above with respect to the server, such as a CPU, an I/O, a memory, a secondary storage, and a display device.

Customer systems 116, 118 and 120 comprise similar components to those of the services system, such as a CPU, a memory, an I/O device, a display device, and a secondary storage. Each customer system comprises a browser program 140 in memory for interfacing to the system.

FIG. 3 depicts a block diagram of a high level functional view of the registry and the registration administration website. The registry 240 stores a managed set of datatypes and functional components in an LDAP repository. The registry maintains data integrity by ensuring that valid and registered data flows through the system and prohibits illegal access to information that is available on the system. Datatypes 302, datatype keys 304, clients 306, and users 308 are registered through the registration administration website 310 provided by the web server 114. This data is then exposed to the system through LDAP. The LDAP is abstracted by a number of manipulator classes used within the registration manager and the client module. Bad datatype publish requests 312 and bad client accesses 314 are logged for review through the administration website.

Clients of the system (e.g., transformer blocks) are also registered. Each registered client is provided a unique textual tag at registration time as well as describing the datatypes the client will subscribe to and potentially publish. The registration block outputs a password that is embedded into the client functional component and provided during its initial connect phase. One having skill in the art will appreciate that other identifiers can be used besides passwords, such as SSL certificates.

Figure 4:
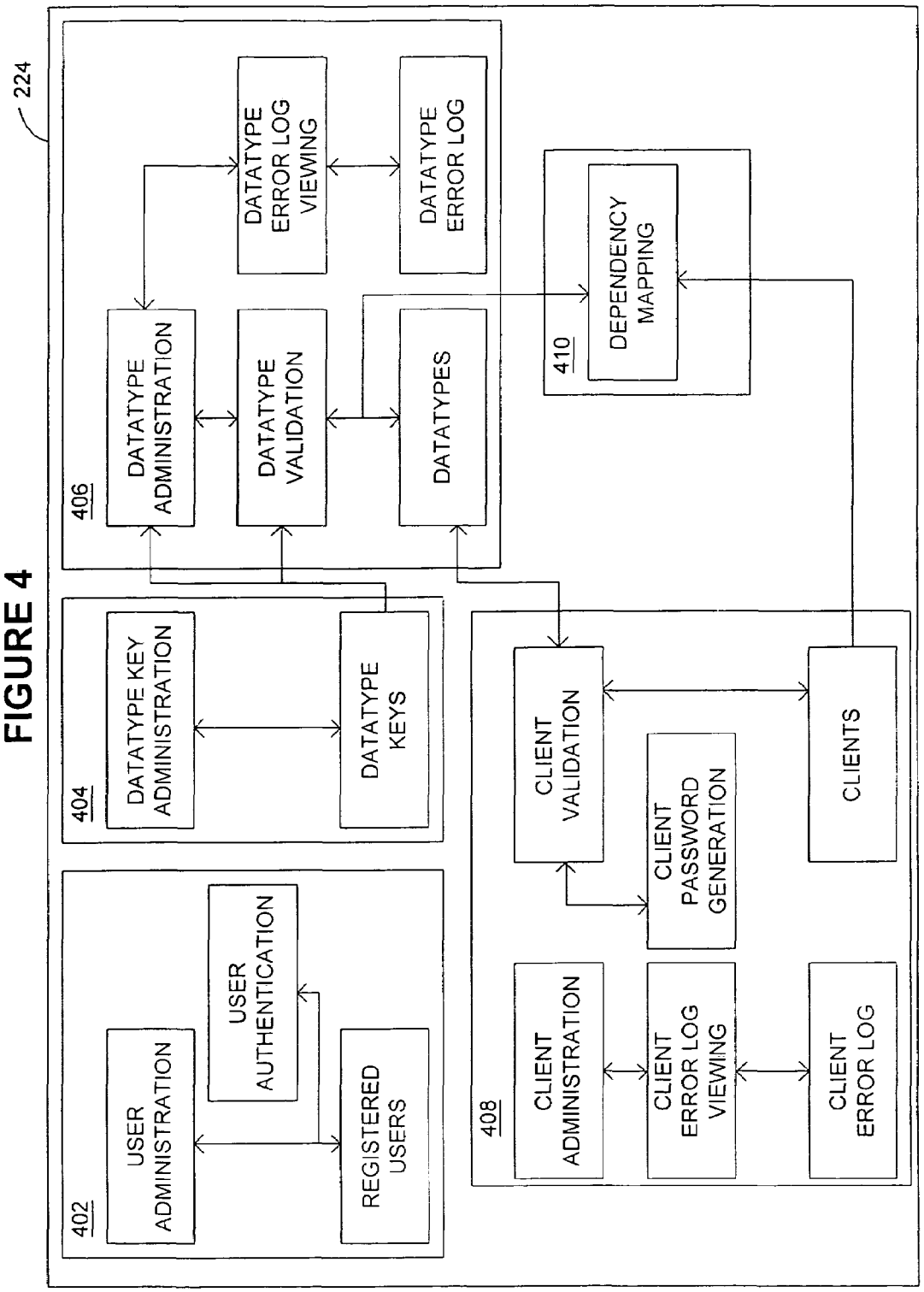
FIG. 4 illustrates a block diagram of the functional components of the registration manager.

FIG. 4 depicts a block diagram of the functional components of the registration manager. As illustrated, the registration manager's functionality is divided into functional components based on the data on which it processes:

User management 402. This functional block manages the access rights to the registration administration website. It allows users to be added, deleted, and updated on the system.

Datatype management 404. This functional block manages the creation, modification, and deletion of datatypes. It also provides a user with a view into any illegal datatype accesses that may have happened.

Datatype key management 406. This functional block provides a method for declaring keys that are associated with datatypes. The datatype keys provide a declarative method for storing relationships between datatypes that will support runtime linking of data.

Client management 408. This functional block manages the creation, modification, and deletion of clients and generates passwords for new clients being registered with the system. It also provides a user with a view into any illegal client accesses that have been rejected by the system.

Dependency mapping 410. This functional block provides relationships between registered datatypes, datatype keys, and clients that use the datatypes. Dependency mapping can assist a user to understand the effects of client data interface modifications or deletions.

The registration manager also manages certain control attributes of the system. The following are managed, with the lists 246 stored, for example, in the secondary storage:

A list of message brokers (messaging servers) which are available and the information that is required to access these brokers.

The allocation of topics to the messaging servers. This relationship is stored in the datatype, however, the calculation of which messaging server to implement the new topic is provided by the registration manager. To determine the messaging server, the registration manager implements load sharing based on the number of topics on each messaging server.

The interaction with the bus manager 224. This enables the automation of create/delete topic actions.

The interaction with the message brokers to create topics.

The list of properties RDBMS 248 available and the information required to connect to them.

The list of file managers 152 available and the information required to connect to them.

The interaction with the storage controllers, e.g., 228, 230 and 232, to create/modify/delete RDBMS tables in the properties database 250.

The registration manager does not provide enforcement logic based on runtime queries by the clients. For example, a transformer client that wishes to publish an invalid datatype is not denied by the registration manager. Instead, the control is maintained by the client module, which interprets information that is returned from the registration manager. The client module interfaces with the registration manager through an object abstraction of the LDAP schema provided by the registration manager.

There are four exemplary types of users of the system:

1. Users who want to introduce new or modify existing external datatypes with the system.

2. Users who want to register new or modify existing clients with the system.

3. Users who want to register new datatype keys with the system.

4. Administrators of the registry.

In addition, the client module provides the following functionality, which requires communication with the registration manager:

Check for client. Validates that the client requesting connection to the system is registered with the system.

Check datatype. Validates that the datatype to be published is a valid datatype and is registered as published by the requesting client.

Retrieve a Client Data Interface (CDI) for the client module. Retrieves for the client a CDI object that comprises the client itself, the data types to which the client subscribes, the data types that the client can publish, and the data types that the client can query.

Register for changes in the CDI. The client module registers for changes in its CDI, such as a change in a subscribed to datatype.

To register a client, the datatypes that the client uses (i.e., subscribes to or publishes) are first registered with the system through the datatype registration. To register a datatype, the datatype keys that the datatype requires are initially defined.

Figure 5:
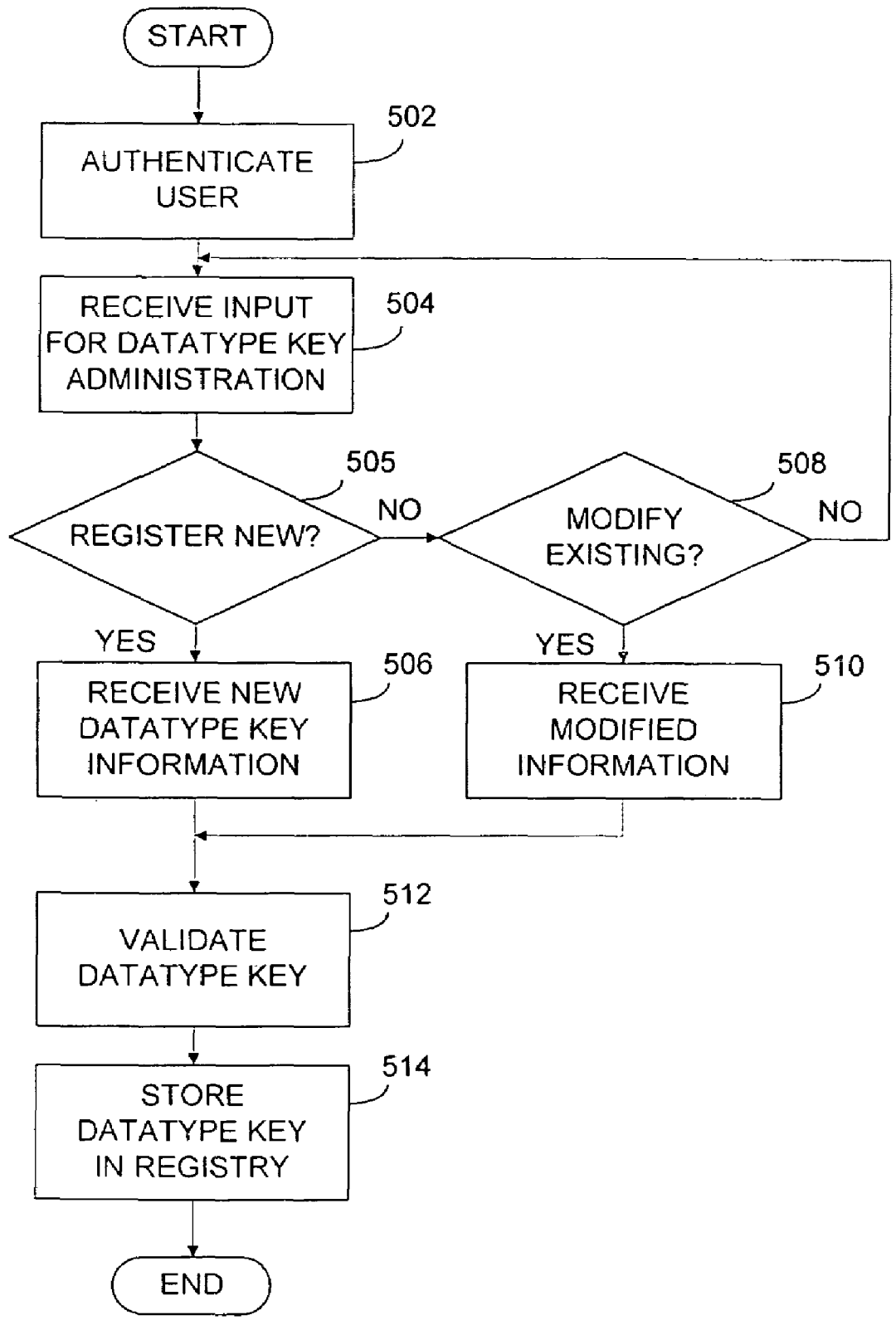
FIG. 5 depicts a flow diagram illustrating the steps performed by the registration manager for creating or modifying a datatype keys.

FIG. 5 depicts a flow diagram illustrating the steps performed by the registration manager for creating or modifying a datatype keys. First, the registration manager receives a user input to log onto the registration administration website (step 502). If the user is not successfully authenticated, then the user is denied access. Otherwise, the user is permitted access to the website. The user is authenticated, for example, by verifying the user's URL or by looking up the user in a list of registered users, which is stored for example in secondary storage. Further, users can be divided into different tiers, with certain tiers having limited access. For example, a standard user can be allowed to create and modify datatypes and clients, but may not be allowed to delete clients and datatypes or view error logs.

Then, the registration manager receives a user input to perform datatype key administration (step 504). The registration manager determines whether the user wants to register a new datatype key (step 505). Datatype keys are singleton keys that are defined within the system to join different datatypes at runtime using a same definition. For example, "hostid" could be defined as a datatype key within the system and the runtime properties of a particular datatype would use this key within its definition. In the process of defining a datatype, the datatype keys are registered within the system prior to the registration of the datatype that requires that key. Therefore, the datatype keys provide seamless datatype instance joins within the system. The client module also uses the datatype keys during its join operations.

For example, in a case a services engineer is installing a new customer system, the engineer obtains, through a subscription, a datatype associated with a data comprising a list of known good installation configurations. The datatype's metadata keys join related datatypes that provide additional knowledge, such as information on why the installation configurations are considered good. These related datatypes are also received through the subscription. Accordingly, the metadata of active data and passive data can be linked, for example so that a subscriber can analyze both types of data.

Table 1 below shows illustrative values associated with a datatype key name.

TABLE 1

| Datatype key id | An identification that is used within the datatype definitions to refer to the key |
| Datatype key name | A name that identifies the key |
| Datatype key type | The type of the datatype (e.g., string, integer, date) |
| Datatype key value | A runtime instance filed value |

Illustrative examples of datatype keys are keys that identify host ID, host name, originating time, operating system version, and architecture.

If the registration manager determines in step 505 that the user wants to register a new datatype key, then the registration manager prompts the user to enter the information for the new datatype key (step 506). In the illustrative example, the registration manager receives information for the datatype key id, the datatype key name, and the datatype key type.

If the registration manager determines in step 505 that the user does not want to register a new datatype key, but instead wants to modify an existing datatype key (step 508), then the registration manager presents to the user a list of predefined datatype keys (step 510). The user selects the desired datatype key and provides the modified information for the datatype key.

Then, the registration manager checks that the new or modified datatype key is valid (step 512). To do this, the registration manager determines whether the datatype key information is complete and the datatype key name is unique. The registration manager then commits the datatype key to the registry (step 514).

Figure 6:
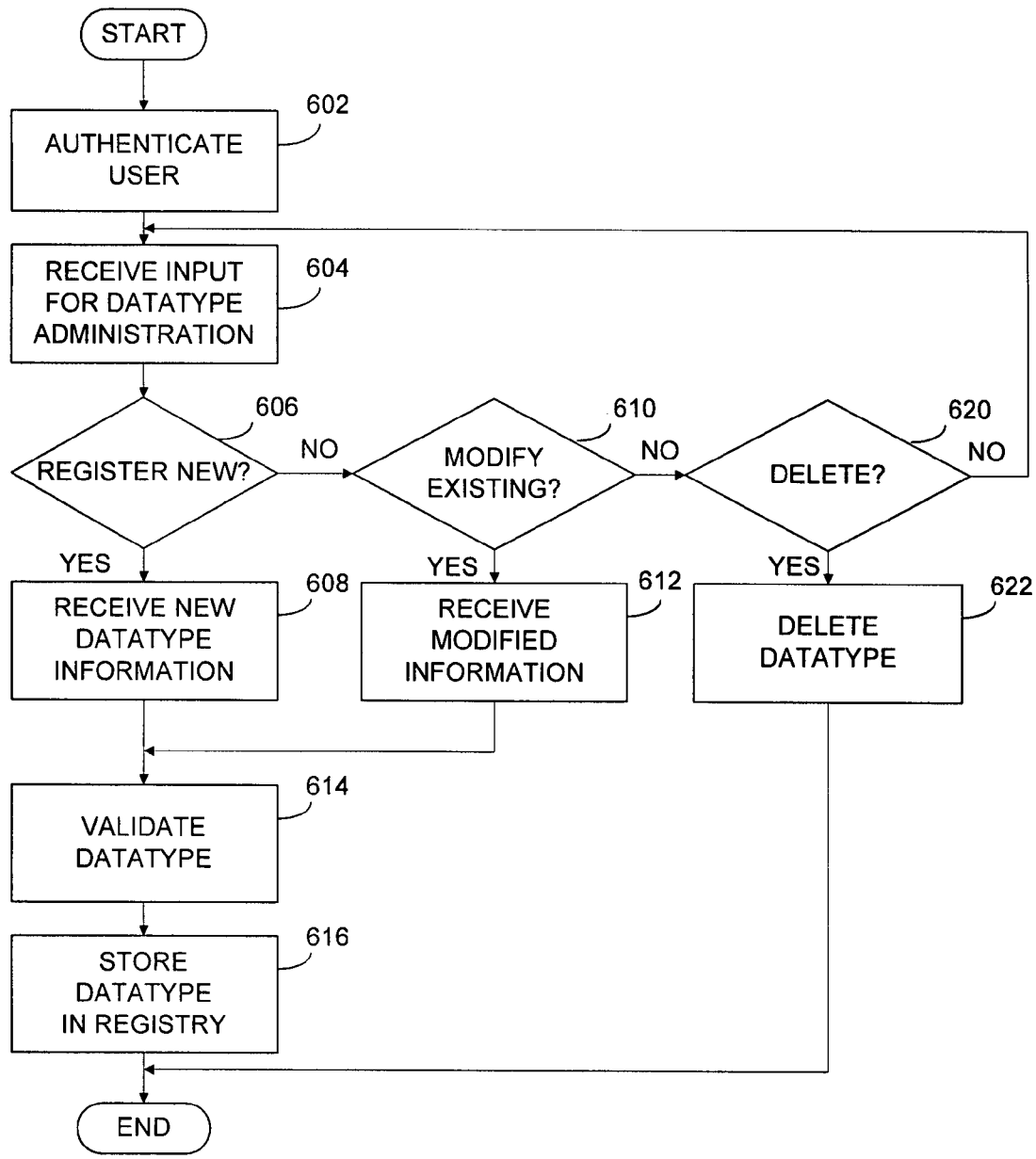
FIG. 6 depicts a flow diagram illustrating the steps performed by the registration manager for creating or modifying a datatype.

FIG. 6 depicts a flow diagram illustrating the steps performed by the registration manager for creating or modifying a datatype. A datatype is a description of each registered piece of information that passes through the system. It is intended to be a flexible definition that can be expanded over time to accommodate a desire to describe the information flow. As described above, datatype keys provide a method of registering relationships between different datatypes other than the relationships between the datatypes and clients. The definition of a datatype comprises a series of name/value properties. The series comprises two areas:

1. Registration time properties. These name/value field are filled in at the time of datatype registration. They include class fields, which describe fields which are common to the datatypes, and instance fields, which are a variable length of name/value fields specific to the datatype being registered.

2. Runtime properties. These properties are name/value fields that are set at runtime and specific to the data contained within the datatype instance. They also include class fields and instance fields. The difference between the runtime properties and the registration time properties is that the name of the name-value pair is set at registration time, while the value is set at runtime by a system client.

In FIG. 6, first the registration manager receives a user input to log onto the registration administration website (step 602). If the user is not successfully authenticated, then the user is denied access. Otherwise, the user is permitted access to the website. Then, the registration manager receives a user input to perform datatype administration (step 604).

The registration manager then determines whether the user wants to register a new datatype (step 606). If the user want to register a new datatype as determined in step 606, then the registration manager prompts the user to enter the registration time properties for the new datatype (step 608). Table 2 below shows sample registration time properties that are entered in the illustrative example. As can be appreciated, some of the illustrative registration time properties are optional and different properties can be used.

TABLE 2

| Property Name | Property Description | Type | Generated By |
| --- | --- | --- | --- |
| Datatype ID | ID that is used to reference datatypes to clients | Integer (unique) | Registration manager |
| Name | Unique name supplied by user who registers the datatype. The datatype name and the version provide a combined unique key. This is different than the datatype key, which relates to the instance, this is to recognize the datatype itself. | String | User |
| Version | The version of the datatype. There may be multiple version of the datatype on the system. | Integer | User |

TABLE 2-continued

| Property Name | Property Description | Type | Generated By |
|---|---|---|---|
| Description | Textual description of the datatype | String | User |
| Creation time | Date and time of datatype creation | Date | Registration manager |
| Created by | User that created the datatype | User administration | Registration manager |
| Last modified | Date and time of datatype last modification | Date | Registration manager |
| Last modified by | User that last modified the datatype | User administration | Registration manager |
| Average size | Estimated average size of the datatype. This is used by the storage controllers to optimize storage capacity. | Integer | User |
| Maximum size | Estimated maximum size of the datatype. | Integer | User |
| Priority | A subjective measure of the relative priority of this datatype to the system/business. | Integer (e.g., 1 highest priority, 5 lowest priority) | User |
| Storage access model | A measure of the storage access model for this datatype. A high priority indicates that the datatype would be queried often, or require rapid retrieval. A low priority indicates an access model that is retrieved and not queried. | Integer (e.g., 1 highest priority, 5 lowest priority) | User |
| Storage properties RDBMS | A string that references the properties RDBMS selected for the datatype. This is inserted by the registration manager using a resource allocator. | String | Registration manager |
| Storage file server | A string that references the fileserver selected for the datatype This is inserted by the registration manager using the resource allocator | String | Registration manager |
| Storage controller type | Identifies the legacy storage controller or core storage controller. | Boolean | User |
| Storage type | Temporary or persistent. A datatype marked as temporary has each instance deleted from the database once the instance has been delivered each of its subscribers. A datatype marked as persistent is not automatically deleted. | Boolean | User |
| Message topic | The message topic associated with this datatype. The message topic is created when the datatype is first created by the registration manager. | String | Registration manager |
| JMS server | The message server is selected by the system based on internal policy controlled by the resource allocator. | String | Registration manager |
| Time relevance | This is a subjective time measurement measured, for example, in minutes that indicates an expected relevance or lifetime of an instance of the datatype. For example, if the time relevance is set to 1440 (24 hours) and the data was 48 hours old, this instance of the datatype would be considered to be invalid by the transformers who are interested in the time relevance. | Integer | User |
| Status | This is a system controlled variable that is set to either VALID or INVALID. A datatype is set to INVALID when its publishing client is set to INVALID. Any client that subscribes to an INVALID datatype is then set to INVALID. This is managed to ensure that the system integrity is maintained. | Integer | Registration manager |
| Body description | A user may alternatively place a link to a description that describes the body message. | String | Registration manager |
| Intrinsic value | The value of an instance of this datatype to the business. | Integer | User |

As noted above, the datatypes also comprise runtime properties that are filled in at runtime. Table 3 below shows sample runtime properties that are entered for the illustrative example. As can be appreciated, the illustrative runtime properties can be different than those in the illustrative example.

TABLE 3

| Property Name | Property Description |
|---|---|
| key(s) | The key(s) for the instance of the datatype, such as hostid. This is selected from a list of available keys within the system. |
| Generated timestamp | The time, for example in GMT, that the data was generated by a system client. |
| Created by | The system client that created the instance. This is, for example, the reference ID. |

The registration manager fills in the information provided by the user and also fills in the information provided by the registration manager as shown in Table 2. To enter the storage properties RDBMS field, the registration manager maintains a list of properties RDBMSs and chooses a properties RDBMS based on, for example, predetermined criteria, such as the closest properties RDBMS to the storage controller.

The resource manager chooses the storage file server, for example, based on load balancing among the file servers. Similarly, the JMS server is chosen based on a load balancing scheme. The message topic matches the datatype on a 1:1 basis.

If the registration manager determines in step 606 that the user does not want to register a new datatype, but instead wants to modify an existing datatype (step 610), then the registration manager presents to the user a list of datatypes from the registry (step 612). The user selects the desired datatype to modify and provides the modified information for the datatype.

Then, the registration manager checks whether the new or modified datatype is valid (step 614). To do this, the registration manager determines whether the datatype information is complete and the datatype name is unique. The registration manager then commits the datatype to the registry (step 616). To do so, the registration manager issues a request, such as an SQL request, to the properties RDBMS associated with the datatype to create or modify a table for the datatype in the properties database. Also, the registration manager issues a request, such as an S1MQ request, to the bus manager to create or modify the message topic associated with the datatype. And the registration manager issues a request to the file server manager to register the datatype.

If the registration manager determines that the user wants to delete a datatype (step 620), then the registration manager deletes the datatype from the registry (step 622). To do so, the registration manager issues a request, such as an SQL request, to the properties RDBMS associated with the datatype to delete a table for the datatype in the properties database. Also, the registration manager issues a request, such as an S1MQ request, to the bus manager to delete the message topic associated with the datatype. And the registration manager issues a request to the file server manager to deregister the datatype. Alternatively, the registration manager can keep the datatype in the registry, but mark the datatype as invalid by setting the datatype status field to INVALID.

Figure 7:
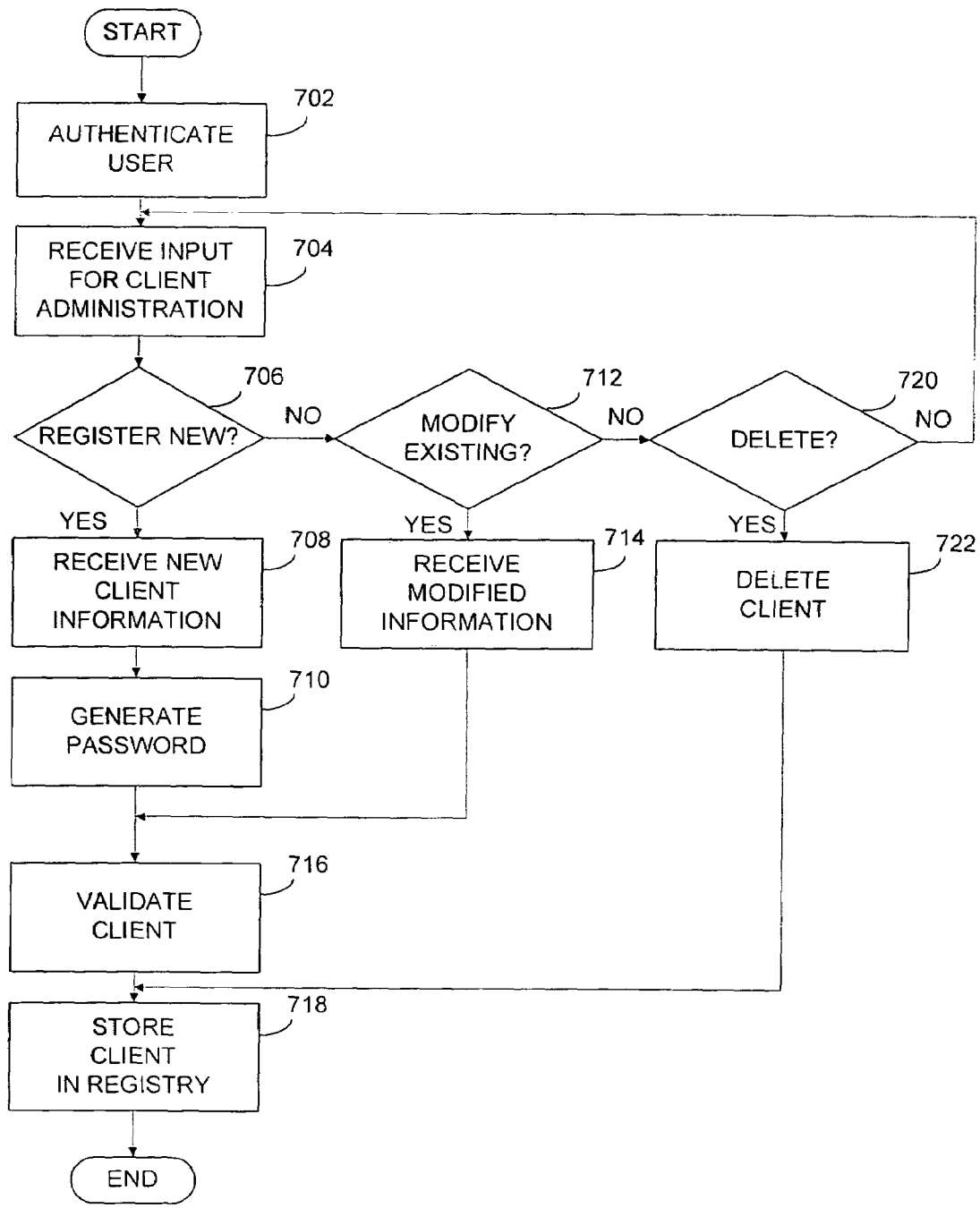
FIG. 7 depicts a flow diagram illustrating the steps performed by the registration manager for creating or modifying a system client.

FIG. 7 depicts a flow diagram illustrating the steps performed by the registration manager for creating or modifying a system client. Clients are consumers and producers of the data. As noted above, clients include transformers, presenters, and external data input managers. The clients are registered with the system in order to describe the client data interface (CDI), which comprises the client itself, datatypes subscribed to by the client, datatypes published by the client, and datatypes that can be queried by the client. The registration manager then instantiates the client as an object using relevant Java Naming Directory Interface (JDNI) requests to the registry.

The client's definition comprises a series of name/value properties, which include mandatory properties and optional properties. Mandatory properties are fields that are filled in for registering clients. Optional properties are specific to the client and are used by the clients as a persistent store of operating parameters. Table 4 below shows mandatory properties that are entered in the illustrative example. As can be appreciated, some of the illustrative properties are optional and different properties can be used.

TABLE 4

| Property Name | Property Description | Type | Generated By |
|---|---|---|---|
| Client ID | ID that is used to reference clients to datatypes | Integer (unique) | Registration manager |
| Name | Unique name supplied to the user who is registering the client. The Client Name and the Version provide a combined unique key. This name is used by the client module to perform a JMS client authentication. | String | User |
| Client type | The user can choose from three main classifications of client: transformer, presenter, and external data input manager. This selection affects what operations the client can perform. An external data input manager publish data. A transformer can publish, query and subscribe to data. A presenter can query and subscribe to data. | System controlled choice | User |
| Password | Stores the generated password for the client. | String | Registration manager |
| Description | A textual description of what the client does. | String | User |
| Creation time | Date and time of client creation. | Date | Registration manager |
| Created by | User that created the client. | User administration implementation specific | Registration manager |
| Last modified | Date and time of client last modification. | Date | Registration manager |
| Last modified by | User that last modified the client | User administration implementation specific | Registration manager |
| Status | This is a system controlled variable that is set to either VALID or INVALID. A client becomes INVALID if any of the datatypes to | Integer | Registration manager |

TABLE 4-continued

| Property Name | Property Description | Type | Generated By |
|---|---|---|---|
| | which it subscribes are marked as invalid. When this occurs, the registration manager marks theclient as INVALID. Accordingly, the integrity of the system is maintained when datatypes or clients are deleted. | | |

Table 5 below shows extended properties that are entered in the illustrative example. As can be appreciated, some of the illustrative properties are optional and different properties can be used.

TABLE 5

| Property Name | Property Description | Type | Generated By |
|---|---|---|---|
| Datatypes published | The datatypes this client publishes, if the client publishes datatypes. | Integer list (reference to the datatype IDs) | User |
| Datatypes subscribed to | The datatypes this client subscribes to, if the client subscribes to datatypes. | Integer list (reference to the datatype IDs) | User |
| Datatypes queried | A list of datatypes the client queries, if the client queries for datatypes. | Integer list (reference to the datatype IDs) | User |

In FIG. 7, the registration manager first receives a user input to log onto the registration administration website (step 702). If the user is not successfully authenticated, then the user is denied access. Otherwise, the user is permitted access to the website. Then, the registration manager receives a user input to perform client administration (step 704).

Then, the registration manager determines whether the user wants to register a new client (step 706). If the user want to register a new client as determined in step 706, then the registration manager prompts the user to enter the mandatory and extended properties for the new client (step 708). Illustrative mandatory and extended properties are identified above in Tables 4 and 5. As indicated above, the user enters subscribed to datatypes in the extended properties. These subscribed to datatypes include a primary subscription datatype and zero or more secondary subscription datatypes.

After the registration manager receives the client information from the user, the registration manager generates the registration manager generated fields, as shown in Table 4, including a password for the client (step 716).

If the registration manager determines in step 706 that the user does not want to register a new client, but instead wants to modify an existing client (step 712), then the registration manager presents to the user a list of clients from the registry (step 714). The user selects the desired client to modify and provides the modified information for the client. In the illustrative example, the user cannot modify the client's primary subscription, but can modify its secondary subscriptions, publishing datatypes, and other information. To modify a client's primary subscription, a new client is registered with the system.

The registration manager then checks whether the new or modified client is valid (step 2). To do this, the registration manager determines whether the client information is complete and the client name is unique. The registration manager then commits the client to the registry (step 718).

If the registration manager determines that the user wants to delete a client (step 720), then the registration manager deletes the client from the registry (step 722). Alternatively, the registration manager can keep the client in the registry, but mark the client as invalid by setting the client status field to INVALID.

To assist a user or administrator with understanding the effects of modifications or deletions in a client data interface, the registration manager provides dependency mapping functionality. Dependency mapping maintains and displays relationships between registered datatypes, datatype keys, and clients that use the datatypes. The registration manager can present the following illustrative information to an administrator or user:

A list of available datatypes and their descriptions currently available within the system.

A list of available clients and their descriptions currently operating within the system.

A map of the relationships between the clients and the datatypes.

A map of the relationships between the datatypes and the datatype keys that link datatypes.

An effect analyzer that displays the effect to clients of removing datatypes, datatype keys, or clients from the system.

To display the dependency mapping information, the registration manager retrieves the relevant information from the registry.

Figure 8:
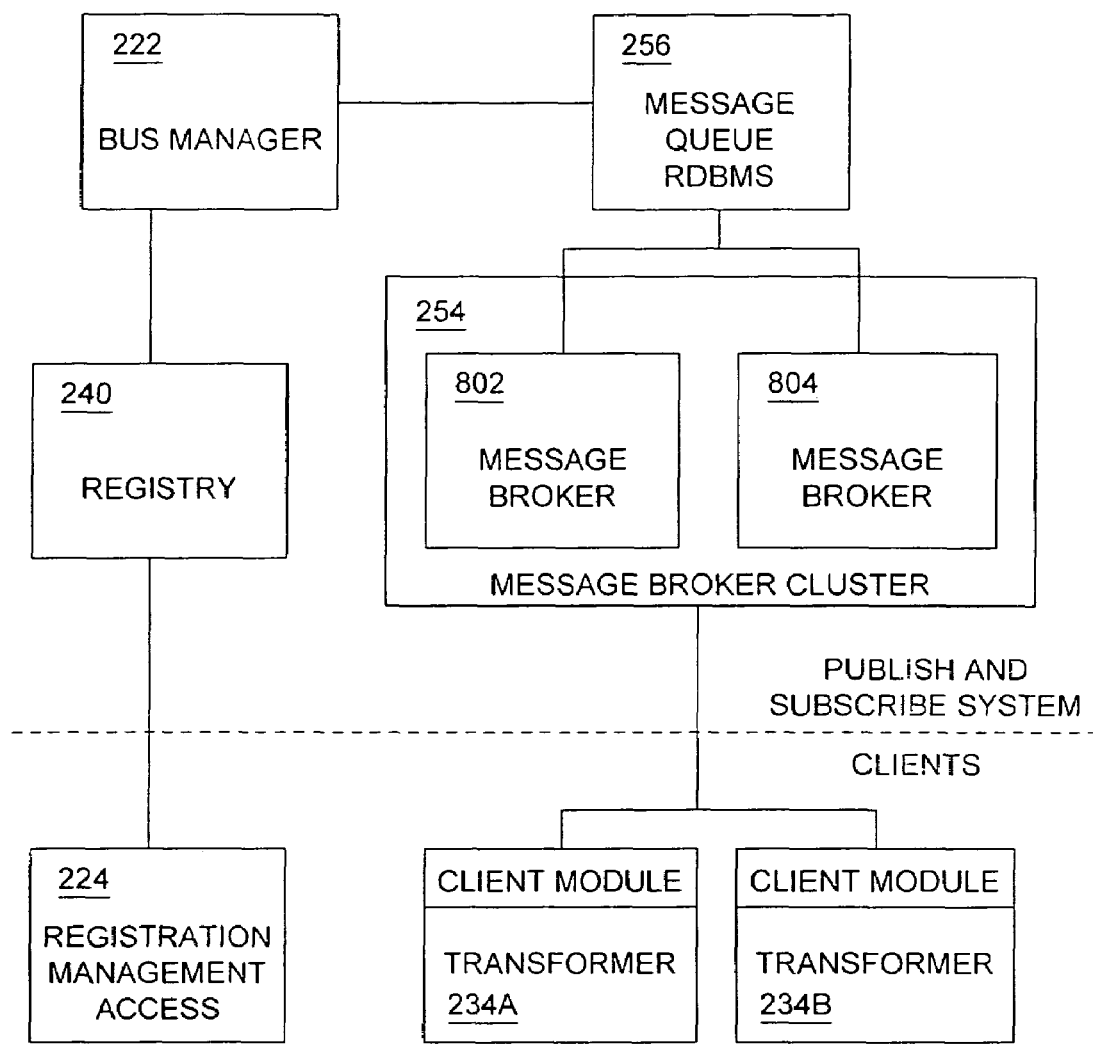
FIG. 8 shows an illustrative functional block diagram of client interactions that occur for passing messages.

After a datatype has been registered on the system by the registration manager, it can be published and subscribed to within a message. As noted above, the bus manager manages the publishing and subscription of messages. FIG. 8 depicts an illustrative functional block diagram of client interactions that occur for passing messages. In the illustrative example, a message broker cluster 254 comprises two message brokers 802 and 804. More message brokers can be added into a message broker cluster to provide vertical scalability on specific topics/datatypes and additional clusters can be added to scale horizontally.

Persistent message queues are managed in the message queue RDBMS repository 256 using, for example, a Java Data Base Connectivity (JDBC) interface available through the message broker. The message queue repository is, for example, an Oracle repository, managed by a message queue RDBMS manager 266. Each message broker cluster has a message queue administration function that provides command line interaction and LDAP/JDNI configuration through its directory services repository.

Clients, such as the transformers 234A and 234B shown in FIG. 8, can publish data for registered datatypes. Data that is published is in the form of a JMS publication to a specified topic maintained by a specific broker running in a broker cluster. The published data is maintained in a message queue in the message queue database until each of its subscribing clients acknowledge reception of the data, at which point it is deleted from the queue. Client subscriptions are durable. That is, the client uses its unique and persistent client ID to register its interest with a message broker that supports the target datatype (i.e., topic). This durable subscription is maintained in the message queue repository until it is deleted. As described above, the registration manager can request the creation, deletion, and updating of topics through a request, such as a JDNI request. Publish and subscribe messaging systems are known in the art and will not be described in further detail herein.

Figure 9:
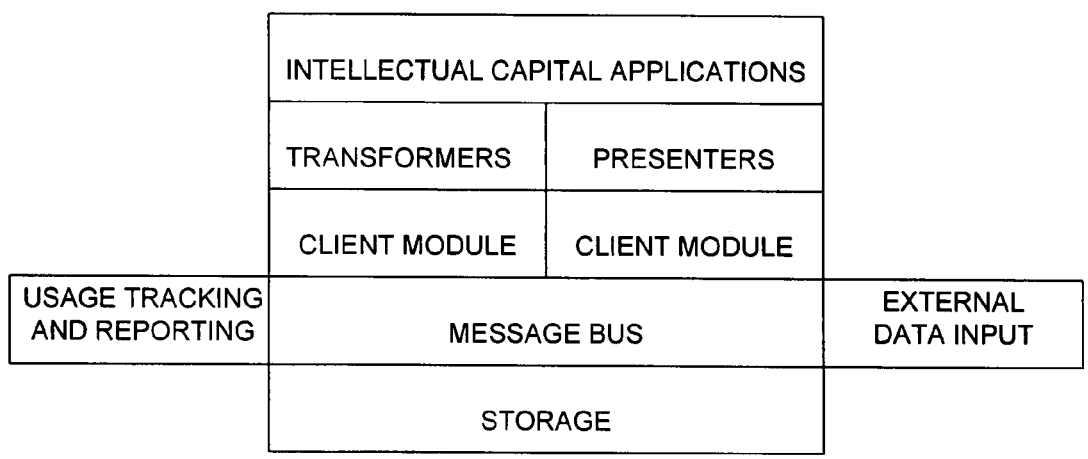
FIG. 9 shows a functional block diagram illustrating the relationships between intellectual capital applications and other functional blocks of the system.

To accommodate for intellectual capital applications that enable improved business intelligence to the services organization and its customers, the applications are built upon system clients, such as transformers and presenters. The transformers and presenters act on data that is made available through the messaging system. FIG. 9 depicts a functional block diagram illustrating the relationships between intellectual capital applications and other functional blocks of the system. The interfaces between the blocks in FIG. 9 show relationships rather than programmatical interfaces.

As shown in FIG. 9, storage is seen as transparent to the intellectual capital applications. The system handles the storage of the datatypes that run through it, while the intellectual capital applications are not concerned with how the data is stored. Instead, the intellectual capital applications are concerned that the data is stored and can be retrieved/queried. This relies on the data being well described, which is a function of the external data input modules 238. They take raw data and associate it with a known datatype that has been registered with the system. As shown in FIG. 9, data input may not be a feature of an intellectual capital application. Applications can be built on existing registered datatypes. Accordingly, this architecture segments functionally the data input components and depicts that they are separate from applications, even if the applications require new data.

Usage and tracking reporting provides a facility to track the usage of data and the activity of tools that use the data on the message bus. This enables profiles to be built on the data and the tools that are used by the services organization. Therefore, data-driven decisions can be made for future developments, and enhancements can be based on value to the business. Tracked usage information includes, for example, when a datatype or client is accessed, published and subscribed to, who publishes and subscribes to the datatype, and processing results of the clients, including what datatypes were used to arrive at the processing results.

Figure 10:
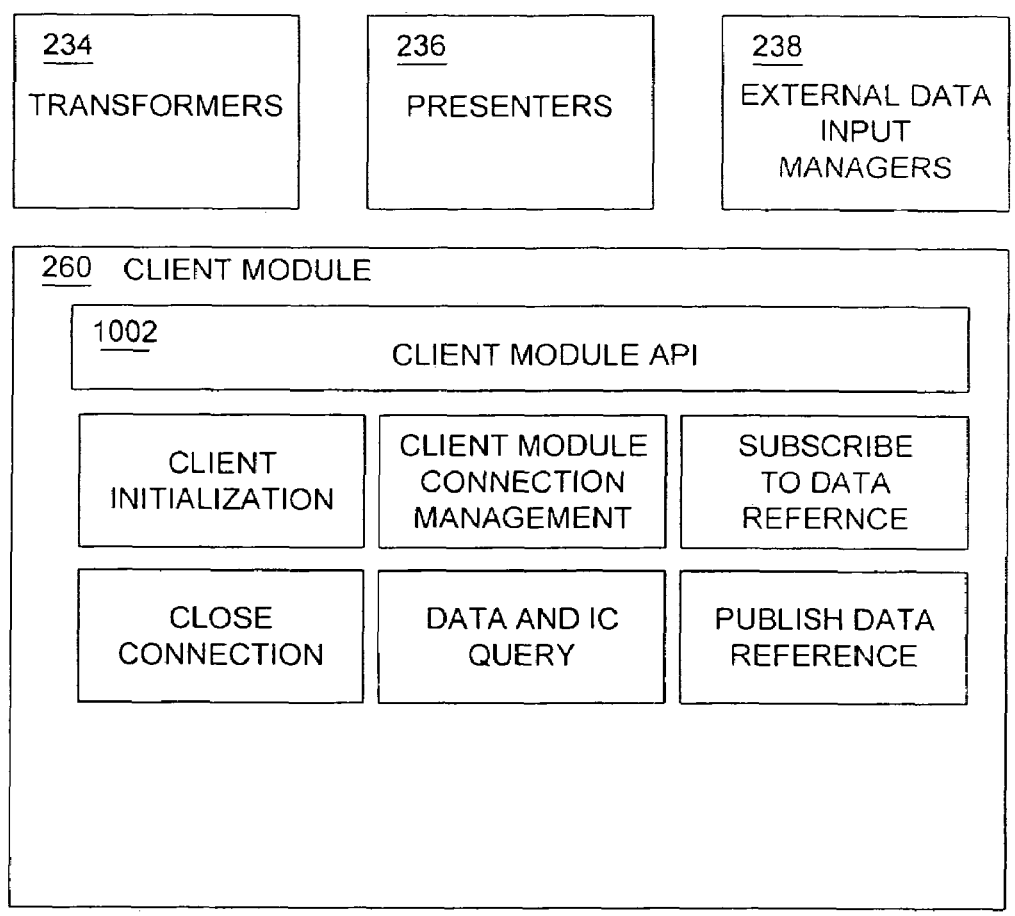
FIG. 10 shows a functional block diagram of the client module and associated clients.

A functional block diagram of the client module and associated clients is shown in FIG. 10. Although three types of clients are shown with a single client module, this is to illustrate that each of those client types can be associated with the client module. A different instance of the client module, however, is instantiated for each client. The client module has a client module Application Programming Interface (API) 1002, which provides access to a developer to data and intellectual capital available on the system. The API is, for example, a Java® API.

The client module functional architecture shown in FIG. 10 illustrates the client module's outbound (to the client) functions. Each of these interactions is described below. Error handling within the client module is managed through a retry before informing client of the error.

Figure 11:
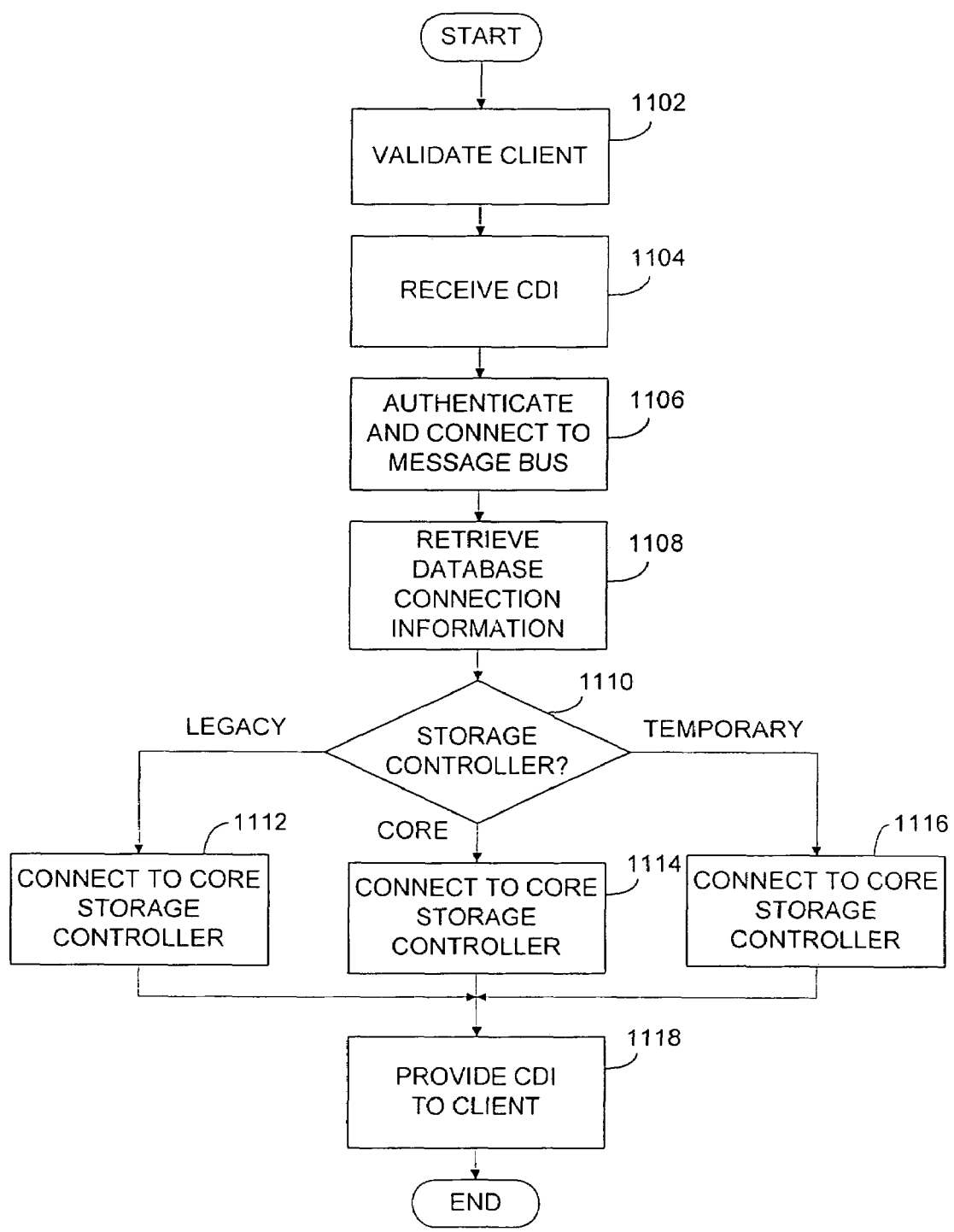
FIG. 11 illustrates a flow diagram illustrating the exemplary steps performed by the client module for initializing a client.

FIG. 11 depicts a flow diagram illustrating the exemplary steps performed by the client module for initializing a client. The first step in the startup of a client is to initialize the client's connection into the system. First, the client module validates the client is authorized to connect to the system (step 1102). The client module analyzes the client name, version and password. If the password is correct, then the client is validated and authorized to connect to the system. Further, if the client is marked as INVALID, then the client is not authorized.

Then, the client module downloads the client data interface (CDI) information from the registry (step 1104). After downloading the CDI information in step 1104, the client module authenticates and initializes connection of the client to the messaging system, but does not enable subscription reception at this time (step 1106). The client name and password are used to provide a unique JMS subscription name to the messaging system. This ensures that future connections will pick up durable subscriptions that may be pending. The client module then retrieves the client's database connection information based on the CDI information (step 1108). This information includes, for example, database addresses, users and passwords.

The client module then authenticates and initializes connection of the client to the storage controllers that are required according to the CDI information (step 1110). Based on the CDI, the client module initializes connection to the legacy storage controller (step 1112), the core storage controller (step 1114), or the temporary storage controller (step 1116). Then, the client module delivers a reference to the CDI to the client for validation purposes (step 1118).

After a client is initialized, it can interact with other functional components of the system through message publication and subscription, using the client module as an interface. The client module manages the active connections between the client module and the system. In the illustrative embodiment, these connections take the form of JMS and JDNI connections. Connections are managed by the client module using an exception catching mechanism. Connection orientated exceptions are caught by the client module, which then triggers a standoff retry algorithm that attempts to reconnect to a problematic service.

Table 6 below shows illustrative settings for connection retry:

TABLE 6

Illustrative settings for connection retry

| | | | | |
|---|---|---|---|---|
| JMS Publish/ Subscribe | Attempt reconnect immediately | Retry after 60 seconds | Retry after 120 seconds | Retry after 240 seconds |
| JMS P2P | Attempt reconnect immediately | Retry after 30 seconds | Retry after 60 seconds | Retry after 120 seconds |
| JDNI | Attempt reconnect immediately | Retry after 240 seconds | Retry after 360 seconds | Retry after 480 seconds |

These variables are exposed as properties and can be set by each client instance to reflect the client's requirements. The variables can also have minimum settings to prevent retry overload by the client.

Upon failure of the last reconnect, the client module throws an internal exception and disconnects connections and initiates closedown. Part of this closedown is to trigger a registered close connection callback in the client. A process of re-initiation or error logging is performed by the client that is communicating through the client module.

The client module also registers with the registration manager, for example through JDNI, to detect changes that may have been made to the active CDI of its client by the registration manager. To do so, the client module performs a callback with the registration manager to watch for modifications to the client and related datatypes in the registry. Then, the client module compares the CDI values with cached values that exist in the client module. If a change is detected and the version of the client has not changed, the client module closes down the active connections and triggers a client closedown connection callback, informing the client that an update to the CDI has occurred. Further, if the client module detects a change in the client's status to INVALID, the client module notifies the client of the error through a closedown connection callback and suspends processing and closes down connections. As described above, a client's status is set to INVALID by the registration manager when a related datatype is deleted or when the client is requested to be deleted. When an error occurs, it is up to the client to implement its predetermined policy responsive to this exception.

The client module also manages the subscriptions of its client. As will be described in more detail below, when data is received through subscription, the reception of data can trigger a client's processing engine. Thus, subscriptions enable the asynchronous reception of data that can trigger processing. Queries, however, provide a synchronous processing model. Queries are embedded in the client and are part of an information collection or ratification phase of the client. The client module supports both subscriptions and queries. When planning a client implementation, a developer should consider which data subscribed to and what data is queried. For example, if a data is subject to change, it may be desirable to subscribe to the data.

Subscriptions use local transactions, therefore, a client will finish processing incoming subscriptions before the message broker is informed that it can remove that client's lock on the message. To commit the transaction, the client issues a command to the client module. Additionally, the initialize subscription command is executed after all subscriptions are complete.

A client can subscribe to a single datatype or to multiple datatypes. The datatypes to which the client subscribes are defined in the client's registry entry.

As will be described below, data is transmitted through the system as a meta data envelope that references the data itself, which is maintained in storage. Envelope meta data is expressed to the messaging system in the form of message properties. An advantage of this is that the messaging system supports subscription by filters. Thus, a subscription command can be setup to subscribe to a datatype based on specific meta data values.

An illustrative example of a subscribe function is as follows:

```
subscribe(datatype where datatype.metadataitem1 =
    xyz and datatype.metadataitem2
    = abc ..... )
```

The subscribe command, does not issue the subscribe request, instead it fills in the profile with the client module. The actual subscriptions are performed when the subscribe initialization is executed by the client module. The client module validates the language semantics of the subscribe command by using the CDI to syntax validate the metadata fields.

The fact that the client module uses filtering on subscriptions is abstracted from the developer of the client. The developer of the client sets up search criteria as described above, which criteria can be used by both filtering and query. Therefore, the client developer is not required to discern the difference between a query being fulfilled by a filtered subscription and a query to the database.

Figure 12:
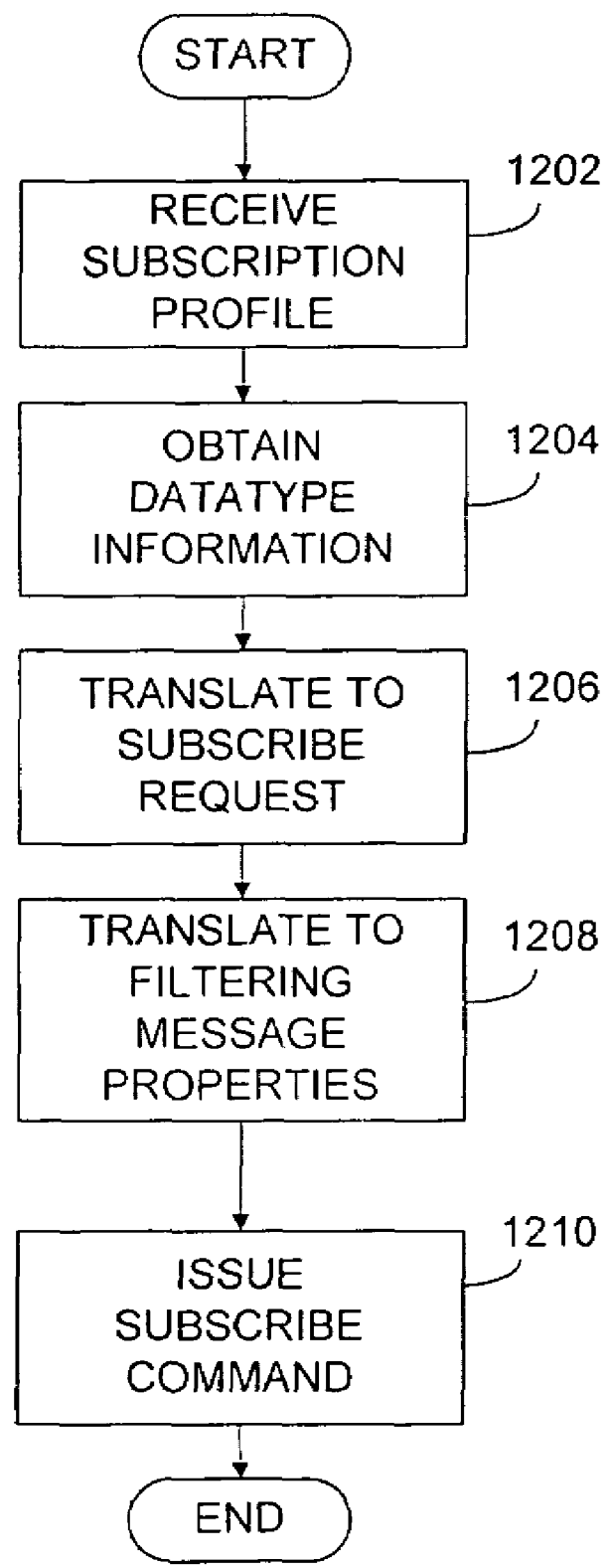
FIG. 12 shows a flow diagram showing illustrative steps performed by the client module for setting up its client for subscription to a single datatype.

FIG. 12 depicts a flow diagram showing illustrative steps performed by the client module for setting up its client for subscription to a single datatype. In this case, the client module receives a subscribe command from the client that contains the client's subscription profile (step 1202). The client's subscription profile contains the datatype of interest and possible message properties that it wishes to filter its subscription on. Then, the client module obtains the relevant datatype definition from the registry (step 1204). The client module translates the datatype and message properties information into a subscribe request (such as, e.g., a JMS subscribe request) to the topic and message server that is described in the datatype definition (step 1206). It then translates the message properties into filtering message properties (such as, e.g., JMS message properties) (step 1208), and issues a subscribe command to the message server as a durable subscription (step 1210). The client's user and password are used to generate a unique user ID for the message server to allocate and manage the durable subscription.

Figure 13:
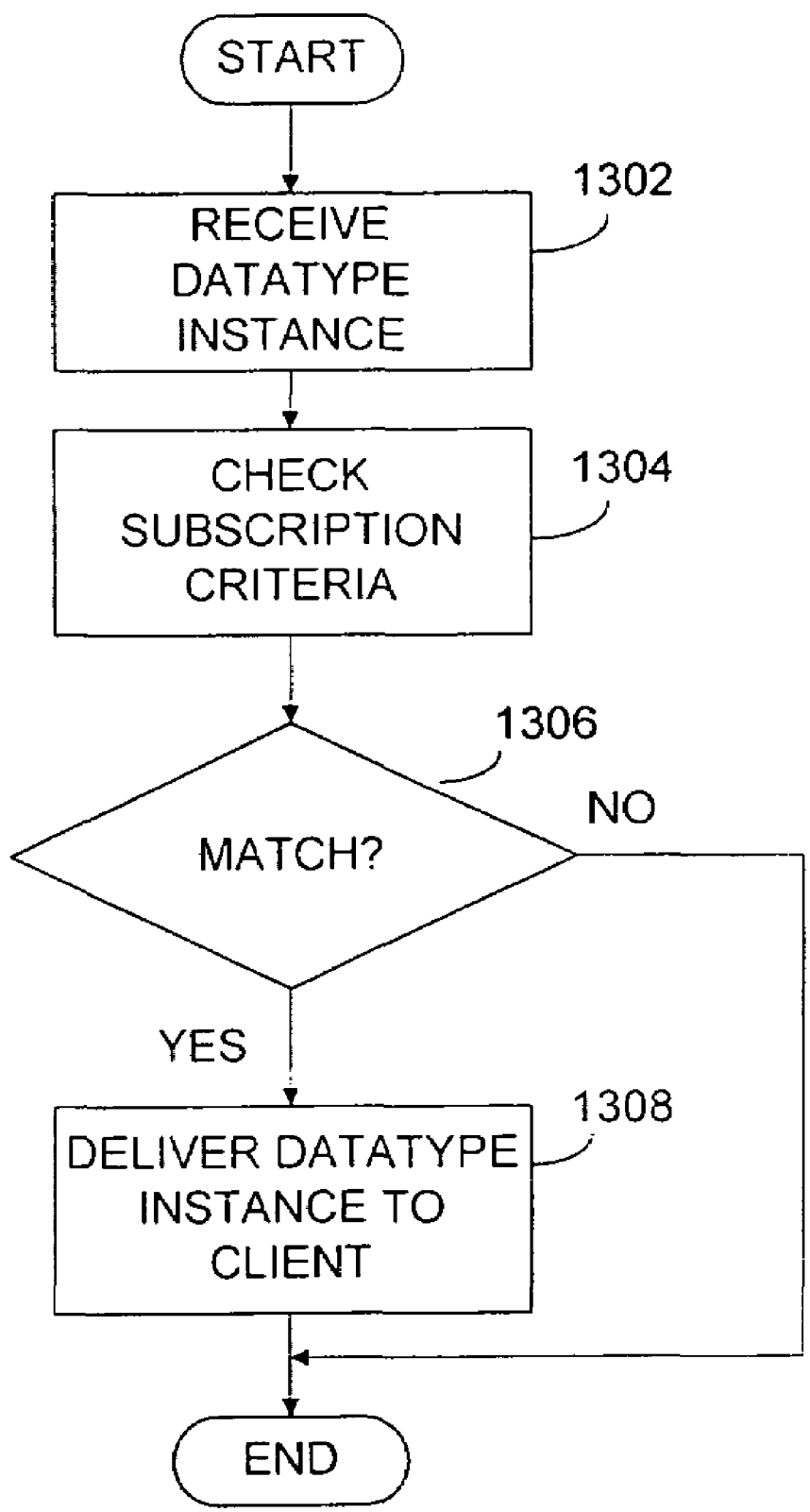
FIG. 13 shows a flow diagram illustrating the exemplary steps performed by the client module for receiving datatype instances.

Once the client is able to subscribe to datatype, published datatype instances are received by the client module, verified, and passed on to the client. FIG. 13 depicts a flow diagram illustrating the exemplary steps performed by the client module for receiving datatype instances. The message server publishes a datatype instance, which is asynchronously received by the client module responsive to the client having identified the datatypes to which it subscribes (step 1302). Then, the client module checks the datatype instance to determine whether it meets the subscription criteria (step 1304). If it is determined that the datatype is verified (step 1306), then the client module delivers the datatype instance to the client (step 1308).

When a client subscribes to multiple datatypes, it is probable that the datatypes are relevant to each other because the client will require each of the datatypes for some processing. The system implements an implicit relevance of time by identifying a time relevance period within each datatype in the registry. That is, each of the instances of the datatypes that are provided by the client module to the client to fulfill the client data interface are within the time relevance period defined within the individual datatypes, unless specifically overridden in the subscription.

When implementing the above-identified restriction in the asynchronous system, it is possible that the system cannot guarantee the arrival time of any one datatype instance within its relevant time period. For example, the datatype may be delayed in its delivery to a subscribing client. In another example, a client that subscribes to two data types, may receive an instance of data type 1 at 12 a.m., and it may not receive an instance of data type 2 with the corresponding primary key until three days later. The instance of data type 2 may not be relevant to the instance of data type 1 at this time, accordingly instead the client would have operated satisfactorily by retrieving an instance of data type 2 from the registry that arrived thirty minutes beforehand.

When a client requests multiple subscriptions to different data types, the client module executes a method similar to when subscribing to one datatype, however the client module accommodates for the multiple subscriptions. When registering to subscribe to multiple datatype instances, the client additionally provides a subscription relevance definition and an error handler when matching relevant data cannot be found. The subscription relevance definition identifies the relationship between the different datatypes. As discussed above, time is implicit unless it is overridden in this definition. An example of a subscription-relevance definition is that the primary key contents of the datatype instances match. This relevance takes the form of a data join on the relevant subscriptions. Data joins are described in more detail below with reference to queries.

The client also provides an error handler when matching relevant data cannot be found. In the case where the client module cannot fulfill the request to find relevant matches for the subscribed data, it sends an error to the client with the relevant found data types, and identifies the missing data types. What the client does with this information is implementation specific to the client.

Multiple subscription requests requires additional syntax, compared to a single datatype subscription requests. The following is an example of a subscription to two datatypes:

```
subscribe(datatype1 and datatype2 where
join(datatype.metadataitem1 =
datatype2.metadataitem1) and datatype1.metadataitem3 =
xyz and datatype2.metadataitem2 =
abc ..... )
```

The above example shows an illustrative example of how multiple subscriptions can be implemented. Multiple subscriptions may use the join-specific command to match specific data instances. The illustrative join statement is listed within the statement to make it easier for the client module to unpack and parse the search criteria since it will be the client module that manages the join statement.

Figure 14:
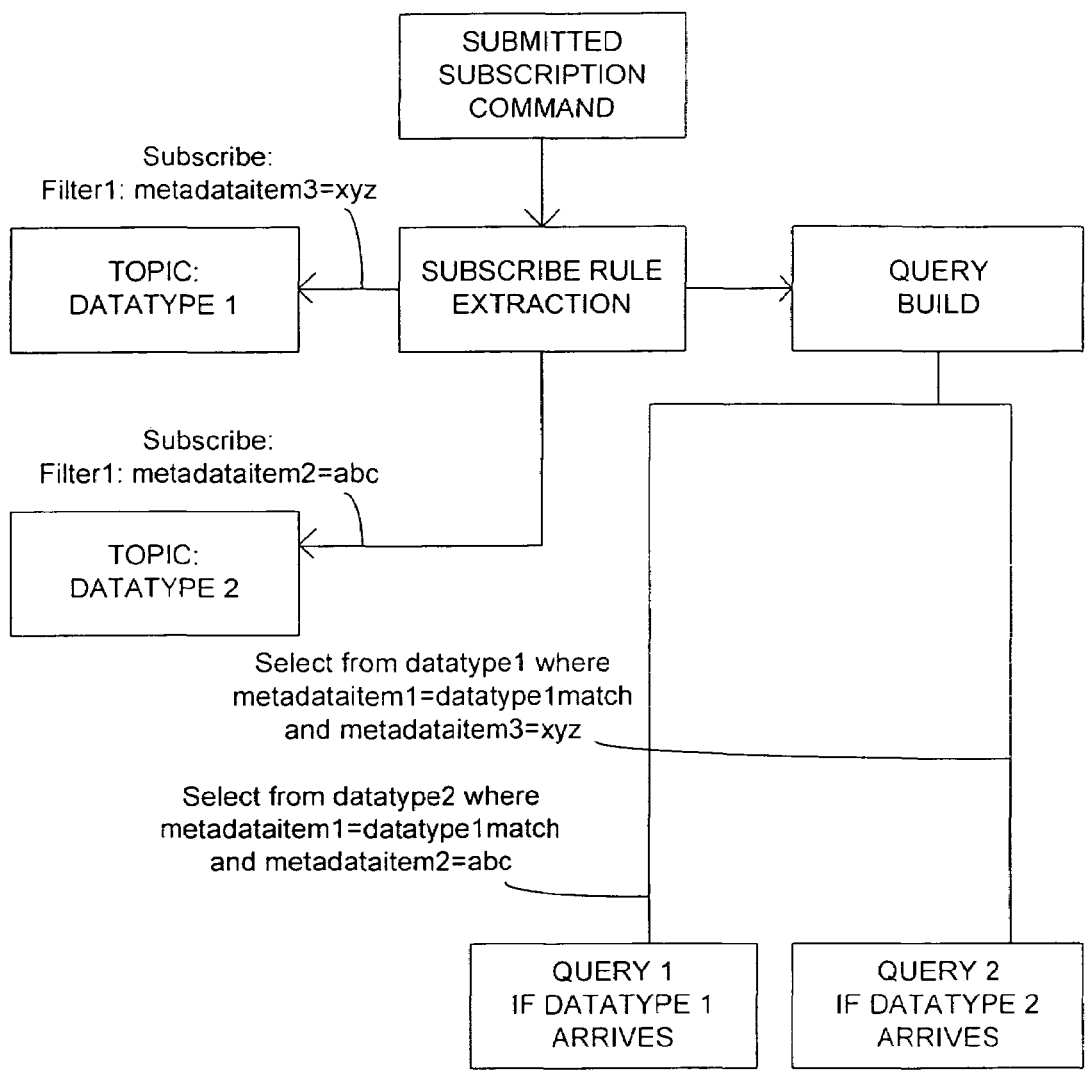
FIG. 14 illustrates a flow diagram illustrating the exemplary steps performed by the client manager to fulfill the multiple subscription request.

This illustrative subscription is implemented in a multi-phase manner. FIG. 14 is a flow diagram illustrating the exemplary steps performed by the client manager to fulfill the multiple subscription request. As shown, subscription filtering and data query are used to fulfill the request. In the illustrative example, the use of the join command in the syntax protects the facts from the command line parser that would be constructing filters for subscription.

Figure 15:
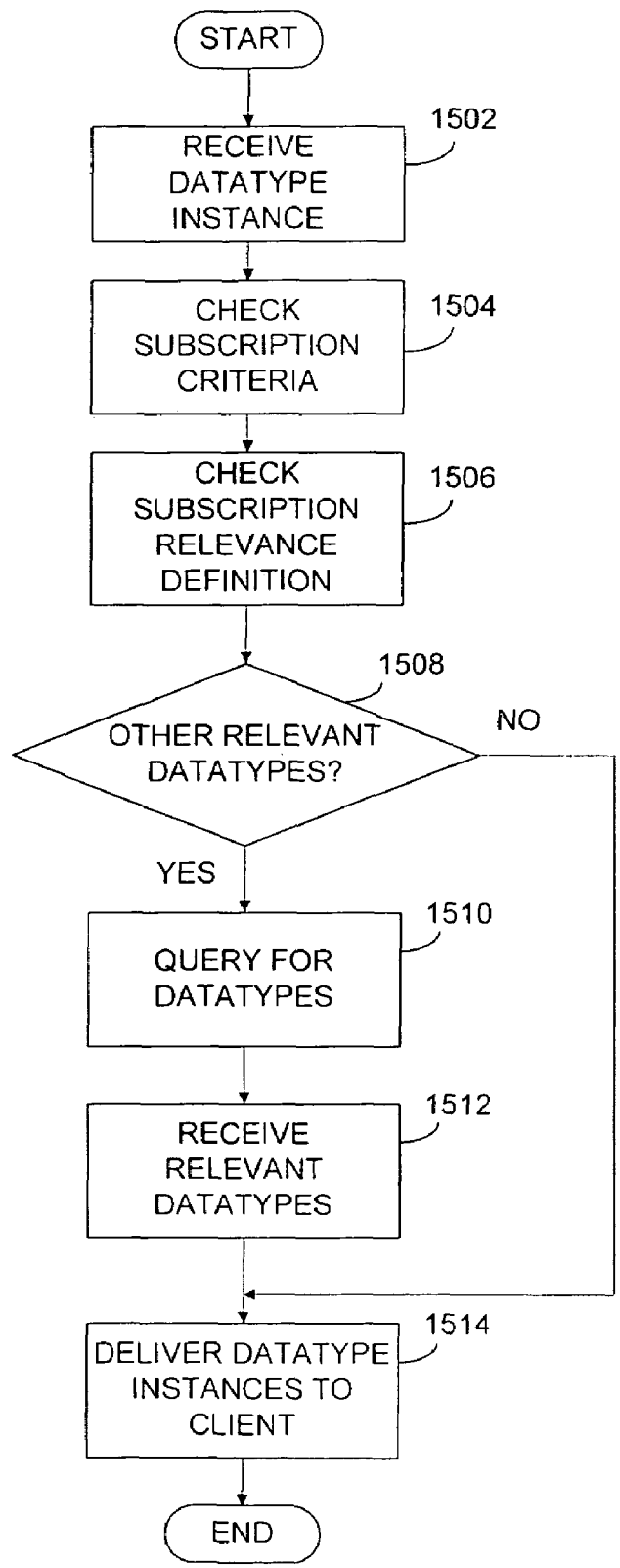
FIG. 15 depicts a flow diagram illustrating the exemplary steps performed by the client module for receiving datatype instances for multiple subscriptions.

After the client is set up to subscribe to multiple datatypes, published datatype instances are received by the client module, verified, and passed on to the client as described below with reference to FIG. 15. FIG. 15 depicts a flow diagram illustrating the exemplary steps performed by the client module for receiving datatype instances for multiple subscriptions. The message server publishes a datatype instance, which is asynchronously received by the client module responsive to the client having identified that datatype as one to which it subscribes (step 1502). Then, the client module checks the datatype instance to determine whether it meets the client's subscription criteria (step 1504). If it is determined that the datatype is verified in step 1504, then the client module checks the client's subscription relevance information (step 1506). As described above, when the client wants to subscribe to multiple datatypes, the client provides the client manager with subscription relevance information.

If the client module determines that there are other datatypes that are relevant to the received datatype instance (step 1508), then the client module queries the client's designated storage controller for instances of the remaining relevant datatypes, using time relevance and the client's specified rules (step 1510). The remaining datatype instances that match the query criteria are then received from storage (step 1512). After the relevant datatypes are received in step 1512 or if it was determined in step 1508 that additional relevant datatypes are not required, then the client manager delivers the received datatype instance and other relevant datatype instances to the client (step 1514).

A client can also de-subscribe to a datatype, for example, by changing the client's designated datatype subscriptions in the registry. This may be done, for example, by an administrator or an intelligent client responsive to a change in the client's client data interface through a registration update.

After a client has successfully completed its processing of its subscription datatype instances, it notifies the client module. This tells the client module to notify the message server that the client has successfully processed the message. Accordingly, if a client fails during the middle of processing received data, the message broker will still indicate that the message was not delivered to the client. Therefore, the next time the client is started up, it will be able to re-receive the message and restart processing.

As noted above, the client can synchronously receive data by querying for data. This may be done, for example, to access historical data or additional information to help fulfill the client's processing requirements. The client module's data query capabilities are similar to its subscription capabilities, a difference being that subscriptions can initiate the execution path of a client where a data query is part of an already running execution path.

A client can query data types that are defined within its client data interface as queryable. The client module data query issues a command to the storage controller that is specified in the client's datatype definition. There can be implemented restrictions on what can be queried using the data query, as in the following illustrative restrictions:

Queries can be made on exposed properties (meta data) of the datatype. Exposed properties are the runtime properties defined in the data type definition.

Joins on datatypes can be performed on runtime properties defined as keys within the datatype definition.

Individual properties can be returned back through the data query, however the whole data body block can be returned deferring segmentation of the data block to the client itself. This supports a theory of the system being agnostic to the contents of the data block.

The queries also use declared relationships and information that is controlled, thus providing query results that are accurate and predictable in their performance. The client module manages a transaction around the query to ensure that the collection of the data to fulfill the query is atomic. To do so, the client module may have to join on data that is from multiple storage controllers.

The query language can be any query language suitable for use with methods and systems consistent with the present invention. Query languages are known in the art and will not be described in more detail herein. In the illustrative embodiment, the query language is based on a version of Standard Query Language (SQL). The query language can manipulate and relevant data. This query language is used in the query and subscribe commands from the client; which uses elements of the query command in the subscribe command.

The query language operates on the metadata of the object, and preferably not the body of the object. Some sample query language statements include select statements, joining datatypes, and comparison operators. The select statement forms the basis of the data query. An illustrative example of a select statement is shown below, which example is SQL compliant:

```
select from datatype1 where metadata1=xyz and
    metadata2>6
```

Joining data types is another function of data query. In the following illustrative example, the join request is explicitly listed because the implementation of the datastore may be distributed. That is, one datatype may be stored on a different datastore to another.

```
select from datatype1, datatype2 where
    join(datatype1.metadata3 =
datatype2.metadata1) and datatype1.metadata1 > 6
```

The query language can also support comparison operators, such as the following, which can apply for example to integer, string and date types:

```
> Greater than
< Less than
= Equals
```

The system provides for both an asynchronous and synchronous interface for data queries. The query interface to the storage controller is synchronous, but the client may not want to block processing while waiting on results. This depends on the architecture and function of the client.

A client can publish zero or more data types. Publishing a data type has a 1:1 correspondence with storage for the system. The publish requests executed by a client are similar to the publish request (e.g., JMS publish requests) that the client module issues to the message server. When publishing, the client module validates the content of the outgoing datatype instance against the datatype definitions that are cached in the client module upon client initialization. If they match, the client module publishes the envelope and the envelope and body are stored in the persistent store.

A publish command can publishes a single instance of a single data type. Therefore, a client makes a separate publish request for each data type instance that it wishes to publish to the message system. The body of the data is supplied through a file or network URL in the publish request. It is up to the client to determine how the data is stored prior to publishing, but the data is to be accessible for successful publication. If a client attempts to publish a piece of data that is a duplicate of data that has been already stored, the registry rejects the store, as the properties RDBMS that stores the meta data will fail to store it based on a multi-field unique key that spans the primary and secondary keys of the datatype envelope table. This unique key is described in the datatype at registration time, as discussed above.

Figure 16:
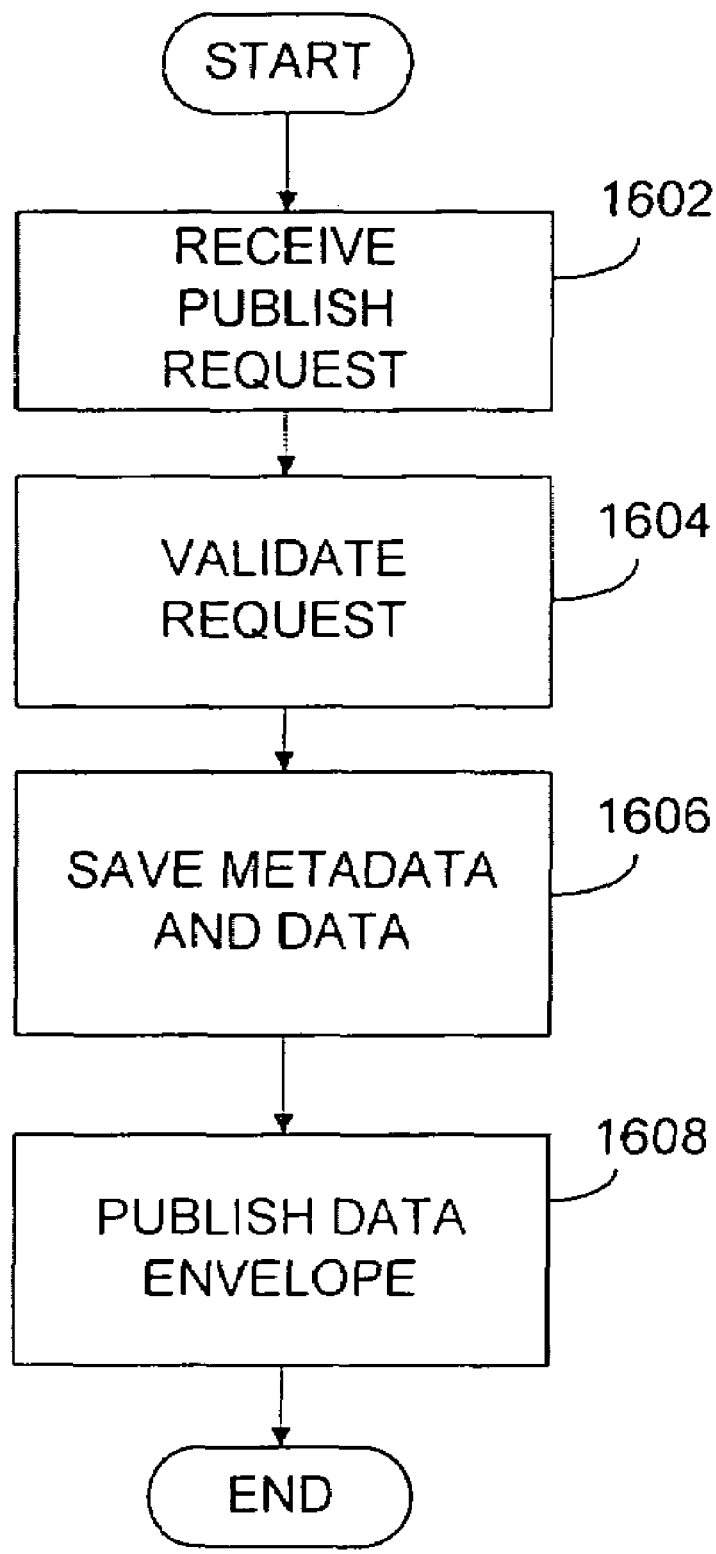
FIG. 16 illustrates a flow diagram illustrating the exemplary steps performed by the client module for executing a publish.

FIG. 16 depicts a flow diagram illustrating the exemplary steps performed by the client module for executing a publish. First, the client manager receives a publish request from the client (step 1602). The client manager validates that the fields that have been supplied in the publish request fulfill the client's client data interface (step 1604). To do so, the client determines, for example, whether the client can publish the datatypes identified in the publish request. Then, the client module saves the data, including the meta data and the body of the data, to the storage device associated with the client (step 1606). After the data has been saved, the client module publishes the data envelope to the bus (step 1608). As noted above, when the data envelope is published, it includes the meta data and a reference to the data itself, but the data itself is not published in the message.

If the save of the data fails, the storage controller sends the client an error code and the data is not published to the bus. Accordingly, duplicate data is neither stored, nor published. After the client publishes a message, the client module can then poll each subscriber to determine whether the subscribers receives the message. If the data is not received by the subscribers, indicating a failed publish, the data that was saved may be removed in the case of a failed publish.

The client can issue a close connection command to the client module, wherein the client module closes all of its JMS and JDNI connections and exits. Further, the client module can perform a client module close connection, wherein the client module calls a registered callback method within the client to initiate shutdown. This can occur, for example, when a fatal reconnect or datatype definition resynchronization has occurred. The client registers the callback with the client module and then the client exits.

The system has access to existing data and knowledge on which to base its logic and processing. As the system evolves, it integrates existing repositories and tools while converting them to native system storage if deemed necessary. The storage controller interacts with the client module to provide properties information from the properties database 250 and body data stored on the file server 150. There can be a plurality of properties databases and file servers. The storage controller 225 can be configured to include one or more of the legacy storage controller, the core storage controller, and the temporary storage controller. The legacy storage controller provides a base for querying knowledge and data that already exists. The core storage controller manages persistent data and provides a storage abstraction layer for storage of managed datatypes within the system. Persistent data is kept and archived according to a policy defined in the system. The temporary storage controller manages temporary data, which is data that is cleaned up according to a policy defined in the system. For example, the data can be persisted until each relevant client has processed it, at which point it is deleted. The storage controller manages both the properties and the body of the data.

Figure 17A:
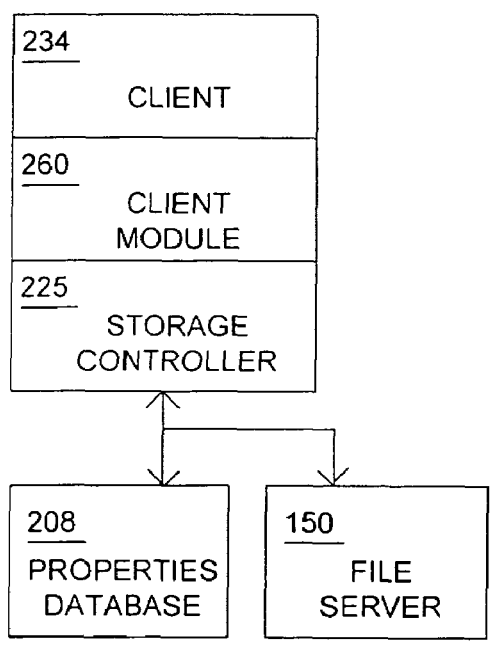
FIGS. 17A and 17B show storage controllers interacting with client modules.
Figure 17B:
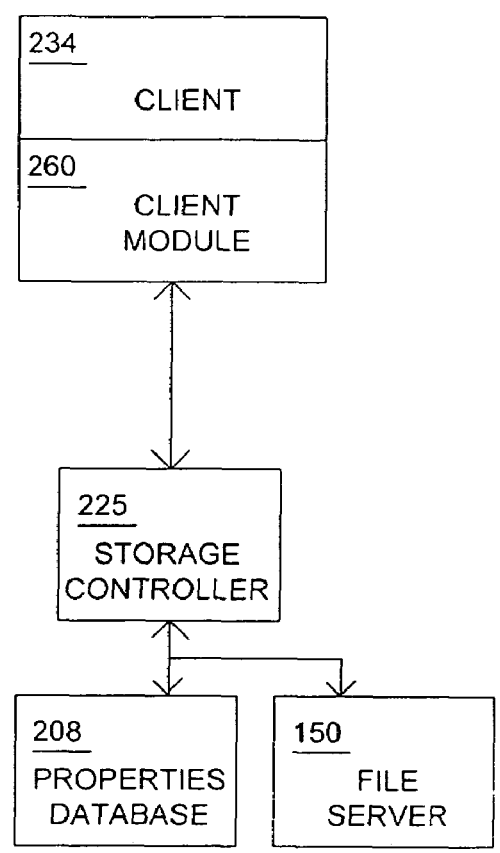

The storage controller interacts with the client module and can interact with the client module in the manners shown in FIGS. 17A and 17B. As shown in FIG. 17A, the storage controller can be in the same virtual memory as the client module, wherein interfacing between the storage controller and the client is via, for example, method call. Alternatively, as shown in FIG. 17B, the client module and the storage controller can communicate over the network using, for example, the Hypertext Transfer Prototcol (HTTP). In the illustrative example, the storage controller uses JTA (java transactions), as the data that is required by clients of the storage controller can be sourced from two locations. In this case, transactions are wrapped around both database accesses. HTTP is a trademark of Massachusetts Institute of Technology, European Research Consortium for Informatics and Mathematics, and Keio University.

Figure 18:
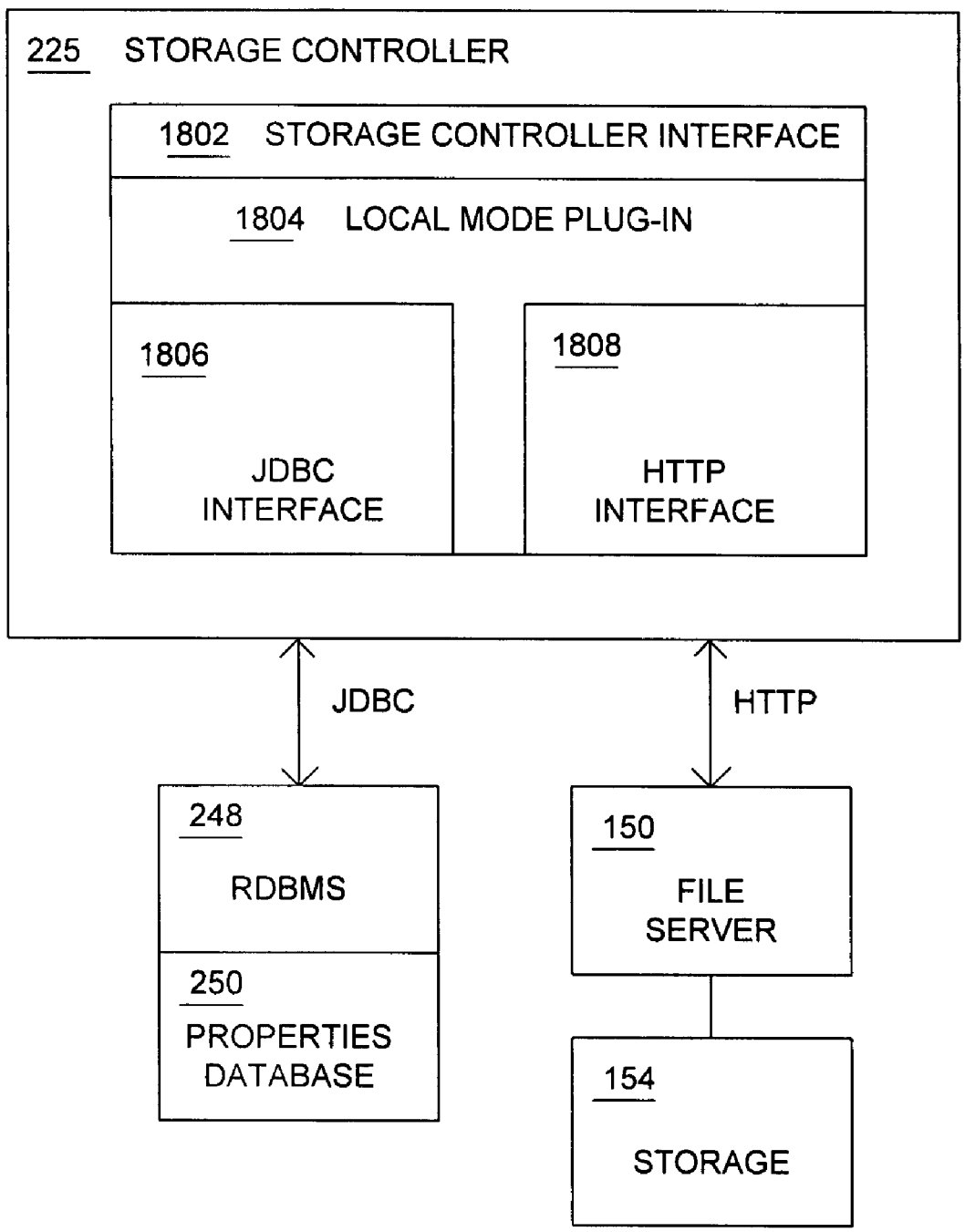
FIG. 18 shows a functional block diagram of the storage controller operating in local mode.
Figure 19:
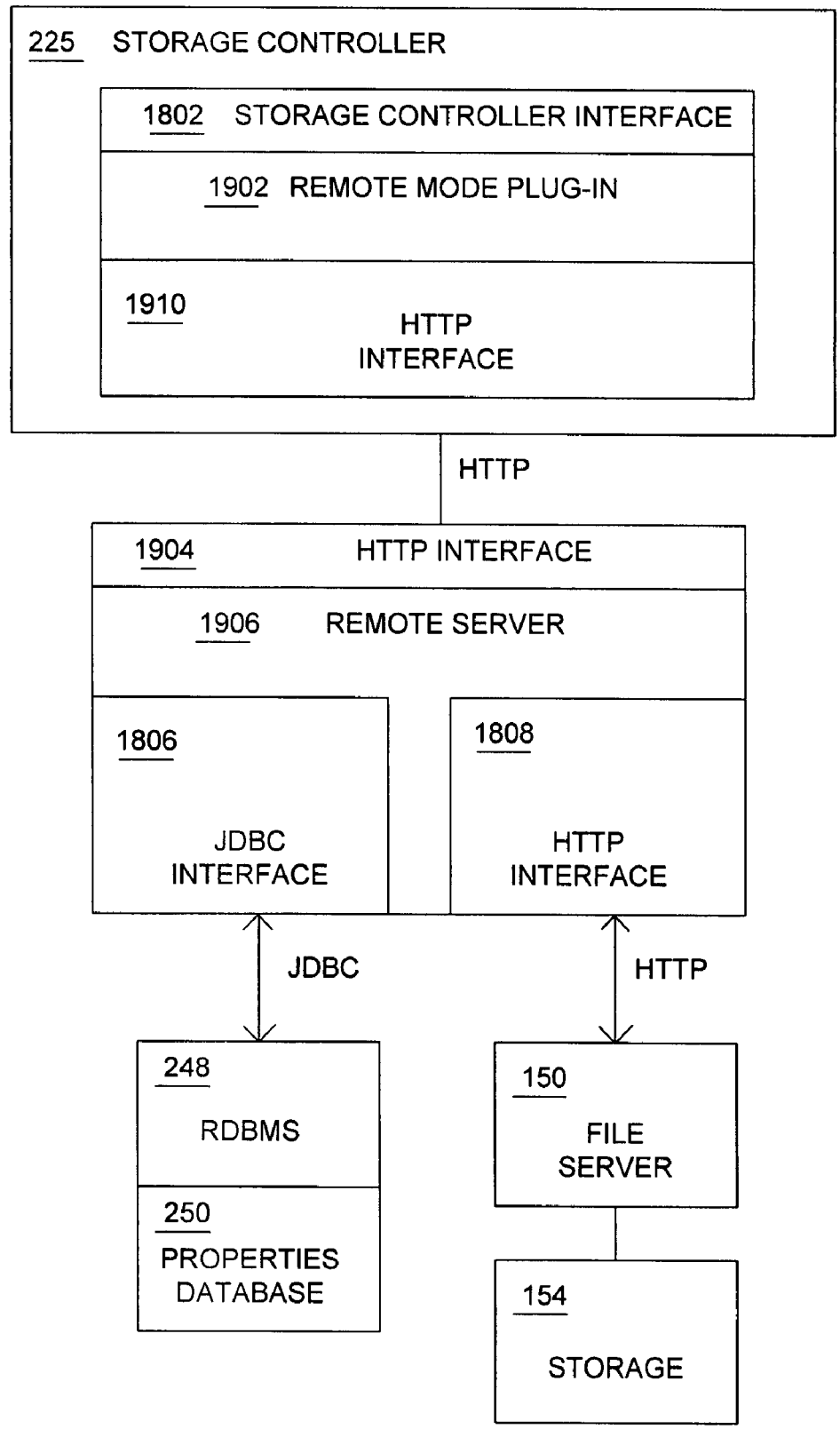
FIG. 19 depicts a functional block diagram of the storage controller operating in remote mode.

The storage controller can operate in three operating modes: local mode, remote mode, and legacy mode. FIG. 18 depicts a functional block diagram of the storage controller operating in local mode. And FIG. 19 depicts a functional block diagram of the storage controller operating in remote mode. Depending on whether the storage controller 225 is operating in local mode or remote mode, various functional components are illustrated. The storage controller interface 1802 exposes an storage controller API to the client module. The local mode plug-in 1804 interfaces with the JDBC interface 1806 and HTTP interface 1808 and manages the storage and delivery of data. The remote mode plug-in 1902 encodes and decodes the requests from the storage controller interface into document form for HTTP transmission and reception. The remote server 1906 is similar to the local mode plug-in in that it interfaces with the JDBC interface 1806 and HTTP interface 1808, and it encodes and decodes eXtensible Markup Language documents. The JDBC interface 1806 manages the interface with the properties database 250. The HTTP interfaces 1808, 1904 and 1910 interface between the storage controller 225 and the file server 150, and between the storage controller 225 and the remote server 1906. Each of these functional components will be described in more detail below.

In the local mode as shown in FIG. 18, the storage controller interface operates in the same process space as the logic that interacts with the databases. The advantage to this, is that the storage controller (and the client module implicitly) can take advantage of the features of JDBC such as connection pooling and transactional control to significantly increase performance. In the remote mode as shown in FIG. 19, a client-server relationship is created. The storage controller interface acts as an HTTP client communicating with the remote server, which is servlet based. The remote server contains similar JDBC and file server logic as the local mode plug-in. In the legacy mode, a legacy storage controller plug-in 226 is loaded that permits access to the legacy storage controller 134.

The mode in which the storage controller operates is defined at instantiation time. A client module could have multiple storage controllers loaded dependant on the needs of its CDI. For example, a CDI is loaded into the client module that involves the following data types:

| Datatype 1: | RDBMS: db1 | FileServer: FS1 | Storage Type: Persistent |
| Datatype 2: | RDBMS: db2 | FileServer: FS1 | Storage Type: Persistent |
| Datatype 3: | RDBMS: db1 | FileServer: FS1 | Storage Type: Temporary |
| Datatype 4: | LegacyStorageController: LSC1 | | |

In this illustrative example, the client module has a storage controller with a local mode plug-in for datatypes 1-3 and a legacy storage controller plug-in for datatype 4.

The storage controller is instantiated with an access model setting. This model matches READ/WRITE, READ, WRITE based on the needs of the client module. An example of a storage controller instantiation is shown below:

```
StorageController(
    accessmodel (READ/WRITE | READ | WRITE)
    server_list
    )
```

The access model can be derived from the CDI by the client module, based on what is subscribed (read), published (write) and queried (read). The relevant file servers depends on the CDI of the client and the mode of operation. A server list contains of a list of file servers where a server is, such as shown in the following illustrative example:

String servername

String rdbmsaddress int number_of connections—This is used in local mode to initiate more than one JDBC connection to a server If the mode is local, the client module supplies to the storage controller a list of properties RDBMSs specified by the data types in its CDI. If the access model is set to read/write or read, the storage controller selects the RDBMS with the fastest response time and allocates it as its primary properties RDBMS. Read functions that the storage controller undertakes will operate through this primary properties RDBMS. This provides predictable performance regardless of physical location on the network.

If the mode is remote, the client module supplies a list of file servers, which list is obtained from the registry. The storage controller then calculates which is the closest remote server based on network performance and uses this as its primary connection. If the mode is legacy, the client module supplies the legacy server address, obtainable from the registry. The server list is stored within the instantiated class for later use.

Figure 20:
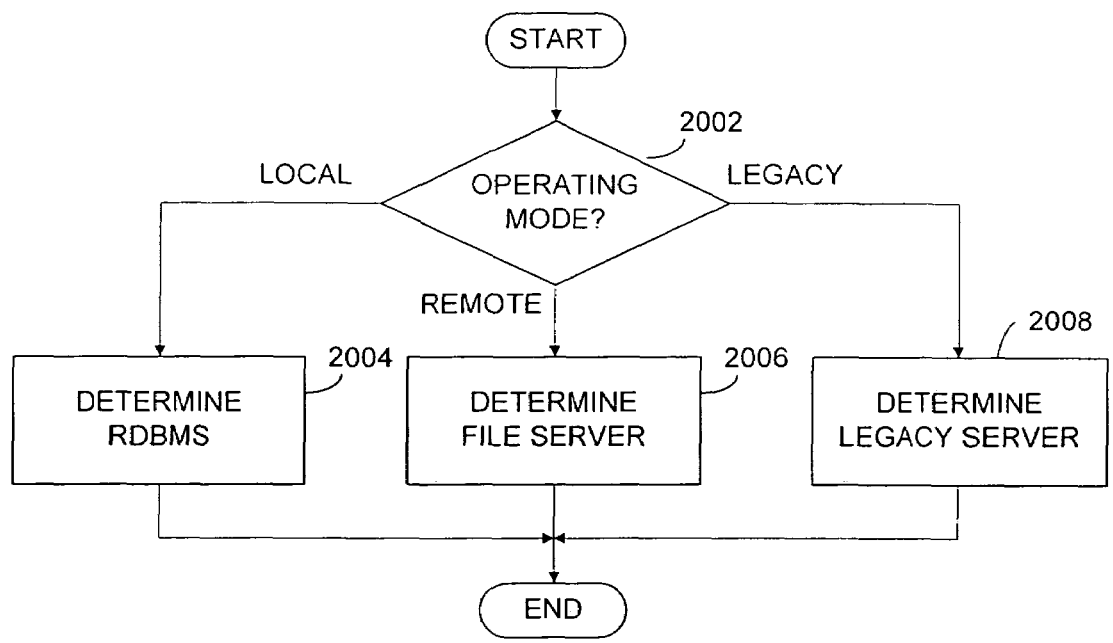
FIG. 20 shows a flow diagram illustrating the exemplary steps performed by the storage controller for setting up its operating mode.

FIG. 20 depicts a flow diagram illustrating the exemplary steps performed by the storage controller for setting up its operating mode. First, the storage controller determines the operating mode: local, remote, or legacy (step 2002). If the operating mode is local, then the storage controller calculates the closest properties RDBMS from the list of properties RDBMSs supplied by the client module (step 2004). As noted above, the list is compiled based on the datatypes in the client's CDI. If the operating mode is remote, then the storage controller calculates the closest remote server using the information on the available remote servers from the registration manager (step 2006). If the operating mode is legacy, then the storage controller uses the legacy server address supplied by the client module (step 2008).

The storage controller interface exposes an API to the client module that does not have specific implementation objects within it. Therefore, the implementation of a RDBMS/file database is abstracted from the client module such that the storage mechanisms could be changed if desired. The storage controller interface provides the following illustrative API methods, which are described in more detail below: initialize sessions, close sessions, get data, data query, and data store.

Initialization of the session is performed by the client module within the constructor of the appropriate storage controller, and varies according to the storage controller mode. In the local mode, the storage controller opens a JDBC connection to the primary properties RDBMS and to other properties RDBMSs identified in the server list. If the connection to the primary RDBMS fails, then another RDBMS is chosen and allocated as the working RDBMS. The local mode model makes use of connection pooling. These sessions are reused by the implicit connection pooling provided by JDBC 2.0. In the remote mode, the storage controller verifies the remote servers are responding to HTTP requests. And in the legacy mode, the storage controller verifies the legacy server is responding to HTTTP requests. Error conditions are handled through exceptions which are exposed by the initialize sessions command.

The close sessions command is used once the client module is exiting processing. It will attempt to close connections to all servers cleanly based on the list specified in the server list.

The get data command is used to retrieve message bodies from the file server given a URL list. The method works in two modes. In the first mode, the caller specifies a file directory in which to store the message bodies and receives a list of URLs that point to the message bodies in the specified directory. In the second mode, the message bodies are returned as documents allocated in virtual memory.

The data query command provides the ability for the caller to request the file body, the properties or both as a result of the query. The client module exposes these options to the client and uses some of these optional retrieval methods itself to fulfill join requests. As in the get data command, two types of message body retrieval are provided, file storage and in memory retrieval. The data query command uses the primary server address to issue queries against if the system is working in local mode. In remote or legacy mode, it uses the server specified at instantiation time. Joining data types is treated in two ways. If the data types are managed by the same storage controller, then joins can be expressed in the SQL string passed through the data query command by the client module. If a join is required across storage controllers, then the client module iterates the join request.

The data store command can save information to the repositories. Storage is done in two phases and transacted using JTA. The data store command is called for each instance of a datatype that needs to be stored. The properties of the datatype are interrogated for RDBMS server name and other storage hints associated with the data type. The actions depend on the mode in which the storage controller is operating. In local mode, the properties are stored to the RDBMS, upon successful storage, the body is sent to the file server along with the appropriate storage hints, specified at registration. In remote mode, an eXtensible Markup Language (XML) document is constructed and sent to the remote server. XML is a trademark of Massachusetts Institute of Technology.

In the command descriptions above, there is described that the message body can be delivered in memory or as a file. When the message body is delivered in memory, the message body is instantiated in memory and a reference to the object is passed through the system. When the message body is delivered as a file, the message body is stored as a file in a file system local to the storage controller interface. A reference is passed to the file as part of the method signature.

The local mode module effectively acts as a container to the JDBC interface the properties database and the HTTP interface to the file server. It also manages a local file system 262 where message bodies can be temporarily stored in a declared working space. The local mode module provides transactional control for data store requests to ensure that both the properties and body are stored or any faults that are detected cause rollback. A command parser of the local mode module interprets method calls from the storage controller interface and converts them into JDBC requests required for property manipulation and/or file server requests to retrieve the message bodies from the file server. The command parser manages the execution path and ensures that the JDBC requests are managed and executed appropriately. JDBC exceptions are returned as is to the storage controller interface, which in turn forwards them on to the client. To facilitate JDBC command construction, each data type name directly maps onto the table name in the properties name and each field in the table maps onto the meta data name described during restriction. The HTTP interface performs a post or a get dependant on the direction of the data request. If required, the HTTP interface uses an internal file manager on the command switch. If the user has requested that the information is available in a file or wishes it to be stored in a directory space, the local mode module file manager supports this by managing space available in the specified directory. The HTTP interface can also support multiple file servers.

As described above, the remote mode module interfaces with storage controller interface. It converts the method calls of the storage controller interface into XML constructs and sends a point to point message using HTTP to the remote server. The XML message content is project private between the remote mode module and the remote server. The remote mode module also provides a file manager module that can store and retrieve files if the storage controller methods are operating in that mode:

When the storage is operating in remote mode, a remote server is used as described above. The remote server supports storage controllers running in remote mode. The remote server decodes the command construct sent by the remote module, executes the appropriate JDBC/file server requests and sends a resultant message back to the client in the response component of the HTTP request. An XML command parser of the remote server decodes the incoming instruction from the remote module and passes the request onto the JDBC Manager/HTTP interface for fulfillment. An XML data construct module of the remote server constructs the result of the action and stores it in the response component of the HTTP document. The remote server also provides a file manager module that provides an interim storage management for any files that are in transit up to the remote module or down to the file server for storage.

The properties database contains the runtime properties of a data type. The tables are created in the properties RDBMS by the registration manager at creation and any modifications are managed by the registration manager. In the illustrative example, the properties database is implemented with an SQL schema supported, for example, by Oracle 9i. The items marked as keys at registration are indexed and a combined unique index is created on the keys marked as unique.

The properties database also has some stored procedures logged on the datatype tables. These stored procedures measure access patterns on the data including, for example, the number of instances that are written to a datatype, and the number of times a datatype is accessed for read. To do so, the stored procedures effectively manage sub-tables which have long integer values that increment upon each access. This data can be used for usage tracking. Each datatype table has a corresponding table, such as the following illustrative example:

---
Tablename: nameofdatatype_version_stats
fieldname: number of instances
fieldname: number of times accessed

---

The file server is tasked with the storage and management of the message bodies. These are treated, for example, as files and the file server manages the distribution of the files for storage and retrieval. The result of a store is a URL, which identifies a stored file. This URL can be used, for example, by a client module to retrieve a stored file. The fileserver is based on a servlet engine and uses a policy input to dictate where and how the files are stored. Each file server maintains a registry of allowable data type bodies it will store. The fileserver also uses the hints provided by the storage meta data of the datatype to understand how to manage the access patterns of the data instance.

Although the system is capable of obtaining new data for processing, the system also supports existing data (i.e., legacy data). As is known, various data can each have different formats. Over time, standards and data processing systems change and new data formats are introduced, resulting in a variety of data formats. Thus, data that is acquired at an earlier date may have a different format than data acquired later. It is further possible that the earlier-acquired data, or legacy data, is stored on a legacy database. The legacy storage controller enables the system to interact with data held in databases and knowledge repositories outside of the direct control of the system.

The legacy storage controller is a process which provides a data mapping from existing data stored in repositories into something the system understands. This mapping, creates properties and bodies from relational or textual data and provides a datatype which can be registered with the registration manager. The system can thus evolve, integrating existing repositories and tools while converting them to native system storage if desired. The legacy storage controller provides a base for querying knowledge and data that already exists. A high level functional view of the legacy data controller is shown in FIG. 21.

Figure 21:
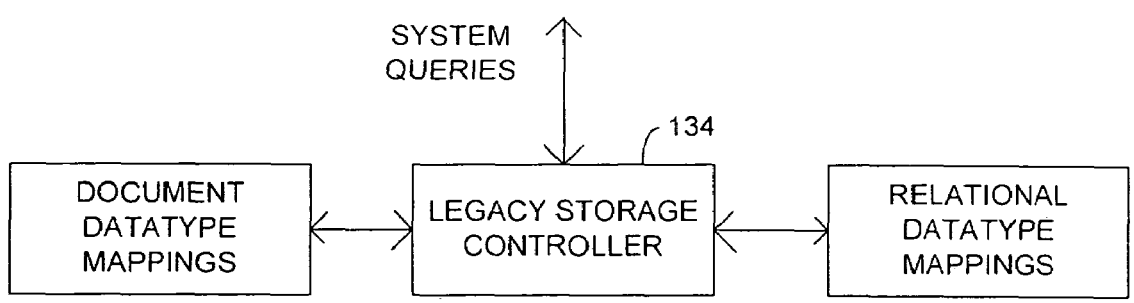
FIG. 21 illustrates a functional block diagram of the legacy storage server supporting different forms of data.

As shown in FIG. 21, the legacy storage controller supports at least two different forms of data: document based repositories and RDBMS based repositories. For document based repository, the legacy storage controller data mapping contains a list of text query/text parse commands used to extract the defined data properties and build/reference the appropriate data body. For RDBMS based repositories, the legacy storage controller data mapping contains a list of query commands, such as SQL commands, used to extract the defined data properties and bodies of the data.

The legacy storage controller provides for querying existing data in the same way a system client would query newly acquired data. Therefore, the system can access data that exists in legacy databases in the same manner as newly-acquired data, without having to publish the body of the legacy data through the system. The data may, however, maintain some historical relevance to some of the system clients. While it is possible to query the legacy data using the legacy storage controller, it is possible that the system can be implemented such that legacy data cannot be written.

Figure 22:
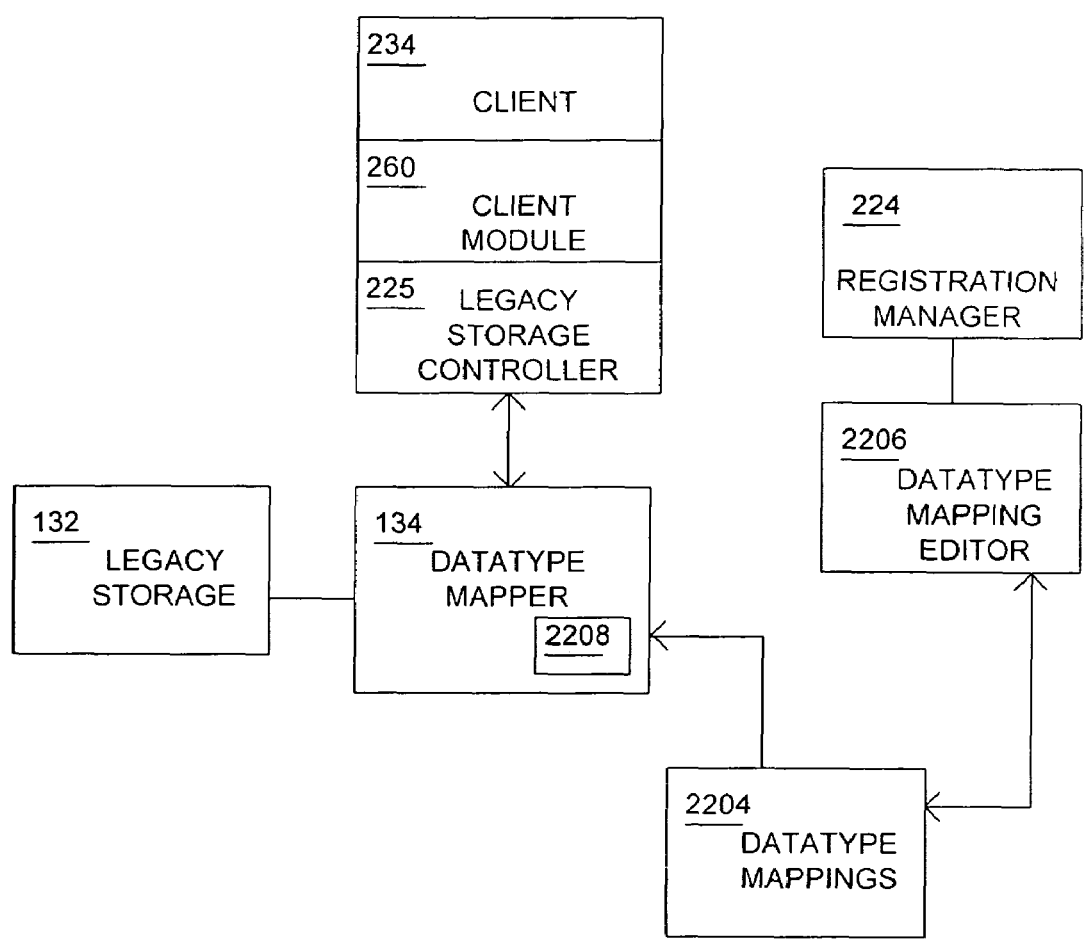
FIG. 22 depicts a functional block diagram illustrating the legacy storage controller in the system.

FIG. 22 depicts a functional block diagram illustrating the legacy storage controller in the system. As shown, a legacy storage controller is associated with the client, in a manner similar to the core and temporary storage controllers described above. The legacy storage controller communicates with a datatype mapper 134, which is a module on the legacy system (e.g., a server) that communicates with the client and provides access to legacy data. Datatype mappings 2208 can be created that map existing data in either SQL or text/file form into a model that the system can understand, notably properties/body. These datatype mappings are created by a datatype mapping editor 2206 and are stored in the datatype mappings repository 2204. There is one datatype mapping per datatype, and each newly exposed datatype is registered with the registration manager with the storage controller type set to legacy. One having skill in the art will appreciate that the datatype mapper, the datatype mappings, and the datatype mapping repository can alternatively be stored at a location other than the legacy system.

When the client module initializes the legacy storage controller, it makes a connection to the datatype mapper using, for example, HTTP. The datatype mapper loads-up the appropriate datatype mappings according to the legacy datatype requests made by the client module and the client.

Figure 23:
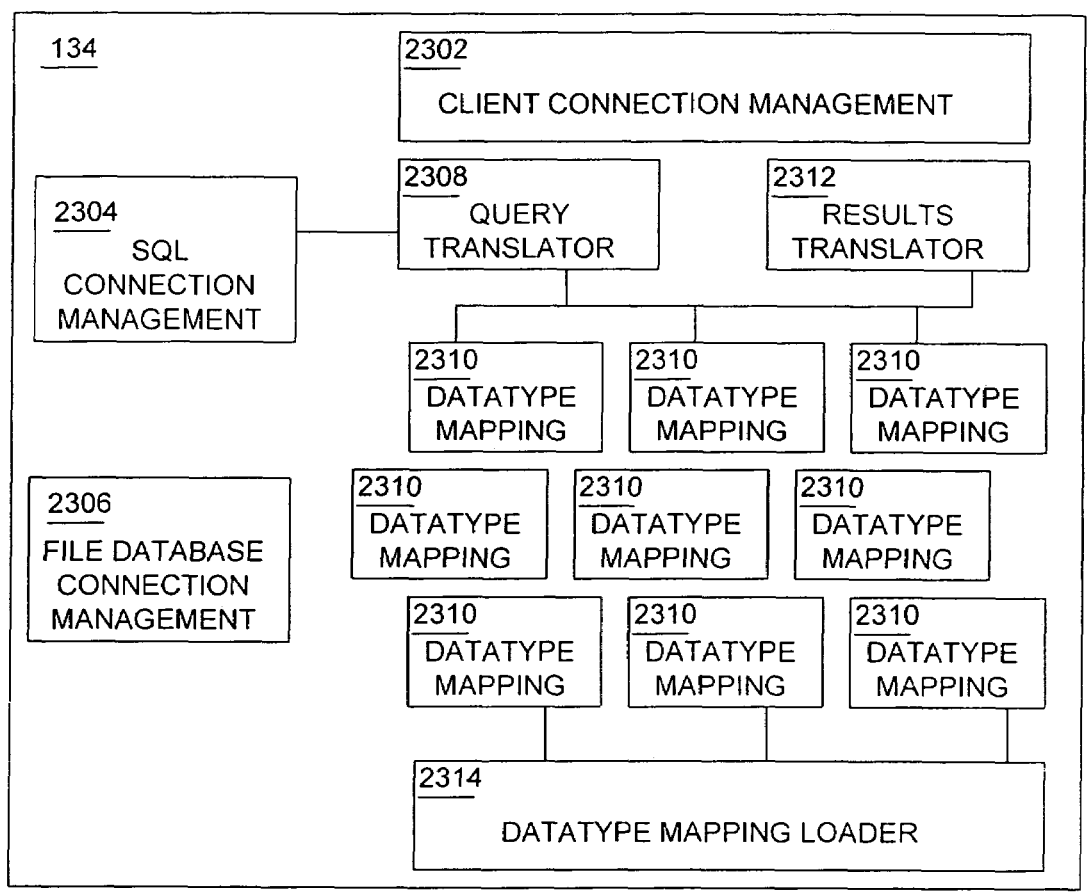
FIG. 23 depicts a block diagram of the functional components of the datatype mapper.

The datatype mapper manages connections to the legacy databases and provides a translation of the incoming query to the legacy format and then a translation of the results from the legacy format to the system format. FIG. 23 depicts a block diagram of the functional components of the datatype mapper. The datatype mapper maintains connections to the source SQL and file databases for optimized queries. Upon startup, the datatype mapper contacts the registration manager and requests information about each of the legacy storage servers. This information includes the address and authentication information required to access the data. These connections are managed by a file database connection management module 2306 and an SQL connection management module 2304, respectively.

A client connection management module 2302 manages the query requests coming from the legacy storage controller embedded in the client module. This connection management passes the query requests onto a query translator 2308, which uses the datatype mapping 2310 for the queried datatype to translate it into the appropriate native query. The query translator then passes control over to a results translator 2312, which translates the results of the query into the registered datatype format and passes the returned array back to the client connection management module for sending to the client. Translating to a datatype format is known in the art and will not be described in further detail herein.

The datatype mapping loader module 2314 loads datatype mappings from datatype mapping storage 2204, for example, from the secondary storage of the legacy system.

The connection management modules uses, for example, HTTP for communications between the legacy storage controller in the client and the datatype mapper. The results of the query are transmitted in one of two ways based on the query command instantiated on the legacy storage controller. Datatype bodies can either be returned in memory or into a local disk cache on the same system as the legacy storage controller.

The datatype mapping editor 2206 is an editor that allows datatype mappings to be created. It will also create the datatype in the registration management system. Datatype mappings are, for example, XML files that comprise the following sample entries:

a mapping between the datatype properties and the legacy data, a mapping to return the data that makes up the body based on the provided query criteria, and a description of how the body is assembled and represented.

These three components provide logic with which the data can be modeled.

Figure 24:
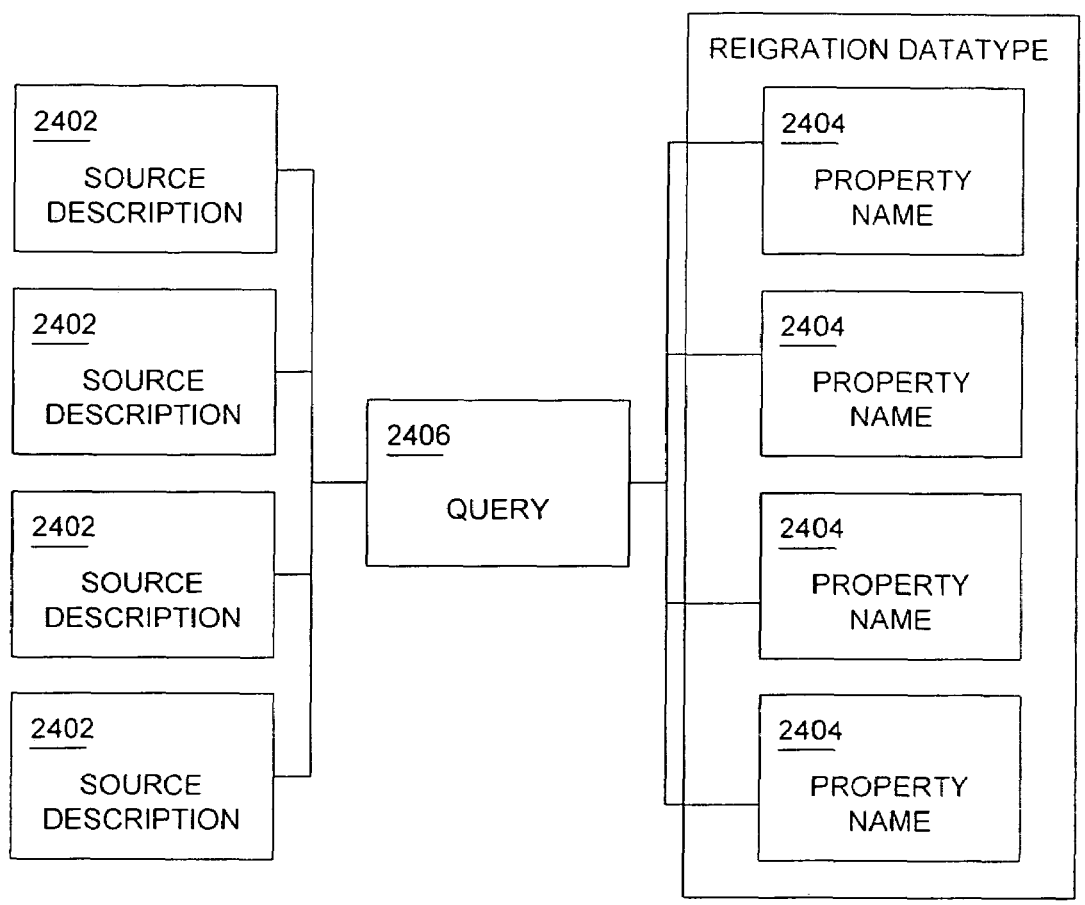
FIG. 24 shows a functional block diagram illustrating how a datatype property mapping is achieved with the datatype mapping editor.

FIG. 24 depicts a functional block diagram illustrating how a datatype property mapping is achieved with the datatype mapping editor. Initially, a user enters a map of the required properties for the datatype. The sources 2402 of the datatype, such as the document metadata and SQL table fields, are then isolated. The user then builds a query that will allow the sources to be queried based on the values coming in from the legacy storage controller.

The property names 2404 that are inserted in the generated registered datatype provide a match into the correct query 2406. For example, a property name could be one of the following:

sql.query3.element1
file.query6.element1

This allows a query to be constructed as follows:

select from table1 where table1.field3="file.query3.element1" . . .

The construction of the datatype body is managed in two ways. First, the queries are designed to extract the data components of the body. The results of these queries are then organized within the body as components, as shown in the following illustrative example:

```
<bodycomponent>
    <Query>
</bodycomponent>
<bodycomponent>
    <Query>
</bodycomponent>
```

Therefore, legacy queries are mapped to SQL queries. Further, the system can work with textual databases. In that case, queries may, for example, take the form of perl search logic or interfacing into a custom text search engine.

Figure 25:
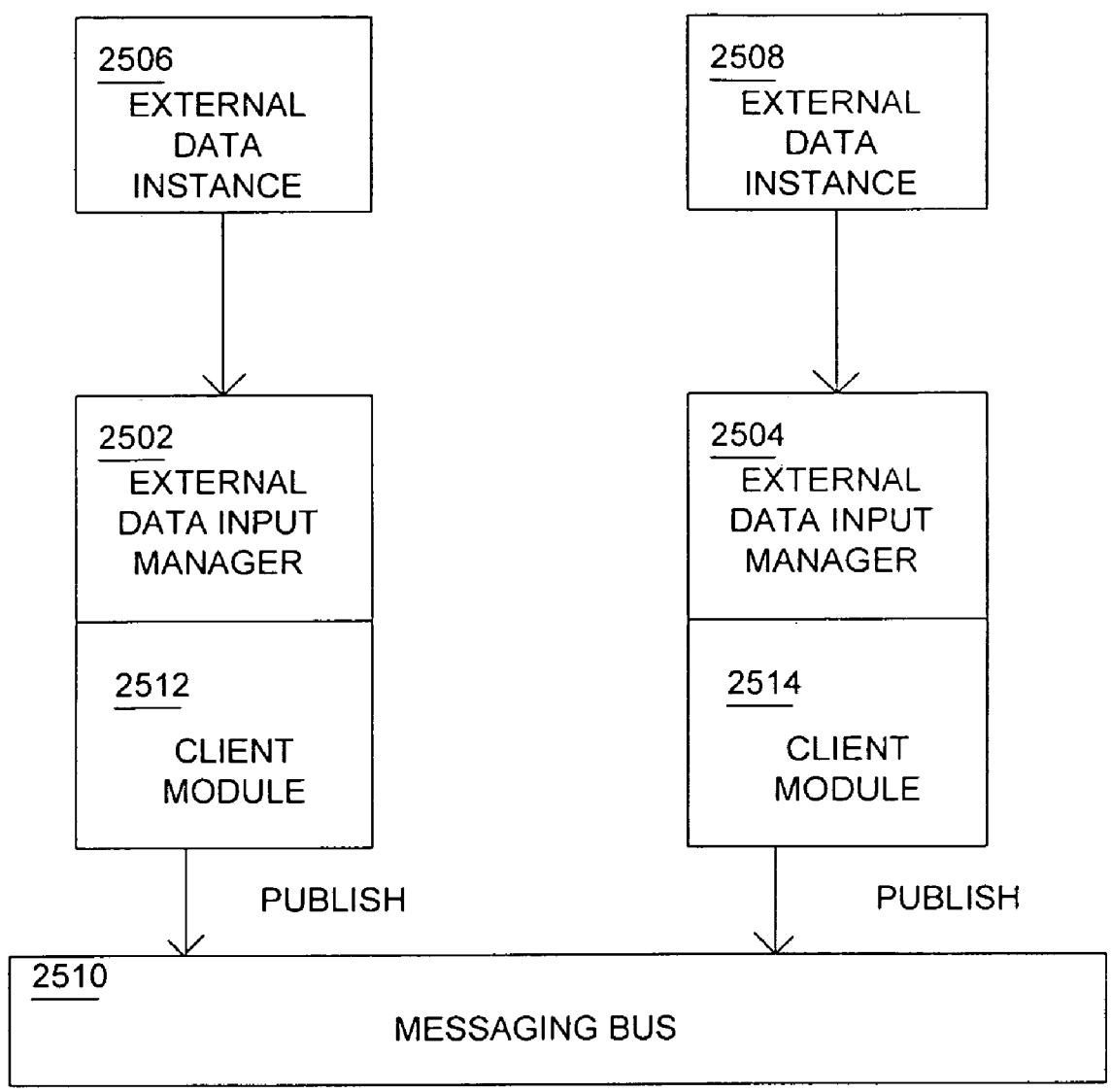
FIG. 25 illustrates a functional block diagram of external data input managers receiving external data instances and publishing to the messaging bus.

In addition to bringing in legacy data into the system through the legacy storage controller, the system can also acquire other external data into the system through the external data input manager. The external data input manager is an input gateway for external data to the system. It wraps and formats an incoming datatype in such a way that the data can be published and used in the system. Each datatype that is external has its own external data input manager. The system is defined in this manner because of the individual data instance specific variables and the tight coupling the external data input manager will have with the specific data type. A functional block diagram of external data input managers 2502 and 2504 receiving external data instances 2506 and 2508 and publishing to the messaging bus 2510 is shown in FIG. 25. As shown, the external data input managers 2502 and 2504 communicate with the bus via client managers 2512 and 2514.

The external data input manager is a client of the system and is therefore registered in the registry by the registration manager. The external data input manager's operations comprise data retrieval of external data, preparing the data to be placed in an envelope, and creating and publishing meta data associated with the data.

Figure 26:
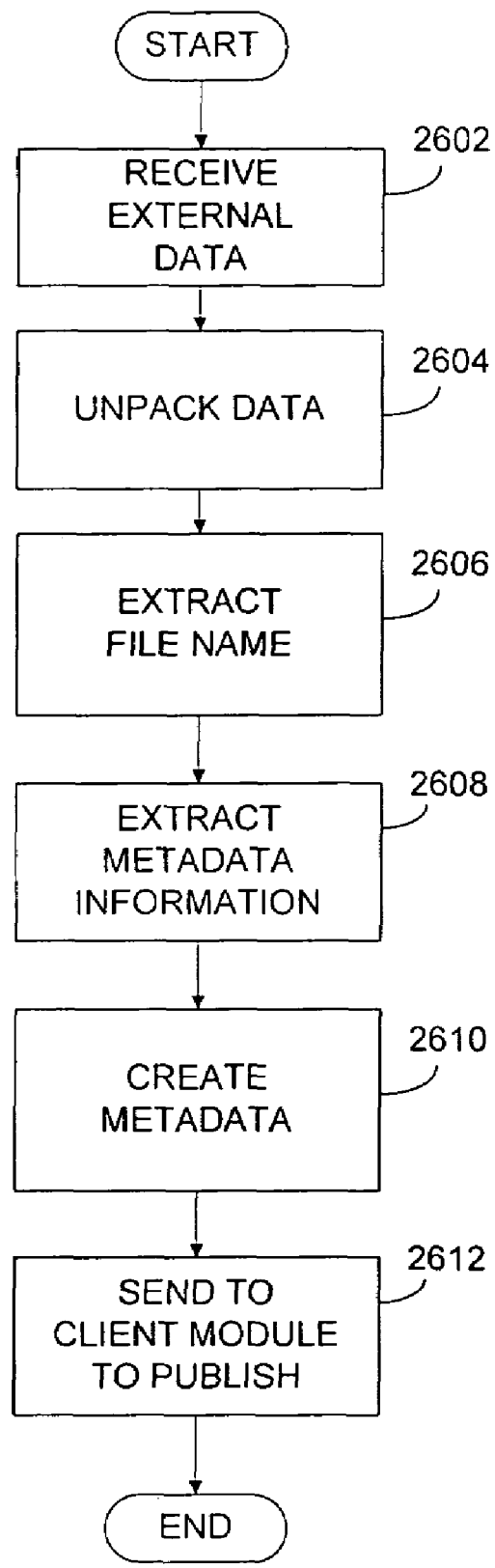
FIG. 26 shows a flow diagram of the illustrative steps performed by the external data input manager.

FIG. 26 depicts a flow diagram of the illustrative steps performed by the external data input manager. One having skill in the art will appreciate that this is one illustrative implementation of the external data input manager, and that its implementation will be influenced by the type and frequency of the data input being managed. First, the external data input manager receives an external data instance from a data source (step 2602). This can be done, for example, by receiving an electronic mail in an electronic mail queue that is periodically checked by the external data input manager.

Then, the external data input manager unpacks the received external data (step 2604). To do so, the external data input manager initiates a connection to the messaging bus via the client module to receive the client data interface from the registry. The client data interface contains information on the datatypes to be published to the messaging bus, along with information that tells the external data input manager what key and meta data information needs to be extracted from the unpacked data. The client data interface also contains information on whether the datatype should be published with the actual data in the message body (data is in memory) or if it should be published with a reference (data is in a file). Once the external data input manager has gather the information as to what is required for keys and meta data, and what datatypes to publish, it then unpacks the received data.

The external data input manager then extracts the file name information (step 2606) and metadata-type information that may be required to put in the envelope, such as primary instance keys and the date (step 2608). After extracting the information, the external data input manager creates a meta data for the data (step 2610), and requests the client module to publish each datatype from the client data interface to the messaging bus, utilizing the extracted information to fill in the values for the keys and metadata (step 2612).

Data input managers like other clients can be highly distributed, and are controlled through a registration scheme. This stops multiple external data input managers of the same type being registered or run within the system.

Once data is in the system, it can be processed by processing engines, such as transformer and presenter clients. Transformers subscribe to data, perform a processing on the data, and publish a data output. Similarly, presenters subscribe to datatypes, and then prepare an output for presentation, for example to a web viewer. Since datatypes are received asynchronously by transformers and presenters, complex intellectual capital processing can be performed on an as needed manner. Unlike conventional techniques, the clients are not limited by static or synchronous links. The system publishes the datatype to expose the data to whatever client may subscribe to the datatype. Therefore, many different types of clients can subscribe to the datatype, mutate the data in some manner, and publish the results. As the data itself does not have to be recognizable to a client, a client that subscribes to a datatype can, for example, concurrently process two instances of the same data that have different formats. If it is desired, the data in a first of the two formats can eventually be converted to the other of the two formats. Thus, processing is not inhibited by the data's format. The clients can still process datatypes for unrecognizable data formats, and eventually phase out those unrecognizable formats.

This provides for complex chaining of passive intellectual capital that is influenced by active intellectual capital. Accordingly, problems with customer systems can be mapped to the intellectual capital quickly and dynamically. Further, new clients can be added to the system without the need for versioning the whole system. Therefore, dynamic solution paths through the system can be reused.

When developed by a developer, transformers and presenters can be configured to fulfill a variety of processing tasks. The registration of clients is described above with reference to the registration manager. In addition to the information described above that is used for registration, the developer also implements processing functionality into the client. The processing functionality can be, for example, an algorithm, calculation, look-up function, or logic.

In an illustrative example, client processing engines can be used to asynchronously detect changes in data about a business or arriving from a customer system and fire business rules and processing to reflect those changes. For example, the system can inform a customer of a potential problem when the customer changes its software configuration on a customer system. Today, software stacks are so complicated that a change in configuration may not typically cause an immediate problem. Services organizations understand the correct configurations of software may not typically have access to knowledge of the change. A transformer on the system can asynchronously receive an information from the customer system whenever a software change is made to the customer system, analyze the configuration against known potential problems, and then publish a notice to the customer of a potential problem. The analysis can be made, for example, by comparing the received data to other data that relates to known problems. Also, if such a problem is discovered on the one customer's system, other customer systems, which have related client processing engines that subscribe to the datatype identifying the problem, will also be informed of the problem. Therefore, the services organization can use the system to asynchronously inform customers of potential problems before they happen.

In an illustrative example of a transformer implementation, a sample transformer parses a system log file received from a customer. The transformer, which is named Syslog Parser, parses raw syslog data coming from an external data input manager and publishes individual lines of syslog data. These syslog lines contain accessible properties that will allow transformers and presenters downstream to filter which syslog lines they are interested in and turn information into knowledge about a particular system.

In the example, syslog information is received in a raw syslog file format. Individual siloed tools are typically implemented to parse and organize this syslog data into a format useful to a specific application. Accordingly, a plurality of many applications typically perform similar or duplicate parsing. The Syslog Parser takes the burden of parsing raw syslog data off the individual application developer. Each line of syslog data received about a system and properties, which are described below) associated with that line of data are published back to the system, where it is openly accessible to downstream transformers and presenters.

Input to the Syslog Parser comprises the hostid of the system the syslog data came from, and a flat text file in standard syslog format. The syslog lines that are published comprise a set of properties that make a particular syslog line uniquely identifiable. Also, they comprise publicly queryable properties to allow a downstream application to determine whether a syslog line is interesting data.

Therefore, the Syslog Parser takes raw syslog data from customer systems one step closer to being transformed into usable Intellectual Capital. It enables new applications to be written that require customer syslog information to produce knowledge. For example, a second transformer can subscribe to the Syslog Parser output information, eliminate information that may have been in a previous syslog, and then publish the new syslog information. In turn, a third transformer can subscribe to the output of the second transformer and process what are identified as interesting events and publish them. Then, a fourth transformer, which is an availability calculator, subscribes to the output of the third transformer and processes it. In turn, the published results can be subscribed to by further clients, such as presenters that present the results to a user.

The Syslog Parser can therefore be considered in three components: Subscribed Data Type (i.e., MessagesFile), Published Data Type (i.e., MessageLine), and Processing.

The illustrative MessagesFile datatype definition is as shown in Table 7 below.

TABLE 7

| Name of Property | Value |
|---|---|
| Name | MessagesFile |
| Description | A datatype containing one or more lines of syslog data in native syslog format |
| Average Size | TBD against a sampling of standard syslog data |
| Maximum Size | TBD against a sampling of standard syslog data |
| Priority | Initially set to "3" (average) |
| Storage Access Model | Initially set to "3" (average) |
| Storage Controller Type | N/A (storage type is Temporary) |
| Storage Type | Temporary |

TABLE 7-continued

| Name of Property | Value |
|---|---|
| Time Relevance | Initially set to 43,200 minutes (30 days) |
| Intrinsic Value | Initially set to "3" (average) |

The MessagesFile datatype keys definition is shown below in Table 8.

TABLE 8

| Datatype Key Name | Description | Type | Unique Combiner | Value Source |
|---|---|---|---|---|
| hostid | hostid of the system the message file came from | String | Yes | external device |
| timestamp | timestamp of the file the messages file came from | Date | Yes | external device |

The MessageFile runtime properties definition is shown below in Table 9.

TABLE 9

| Runtime Property Name | Description | Type | Value Source |
|---|---|---|---|
| message body URL | URL to retrieve the message body from the storage controller | String | System Bus |

The MessageLine datatype definition is shown below in Table 10.

TABLE 10

| Name of Property | Value |
|---|---|
| Name | MessageLine |
| Description | A Data Type describing a single line of syslog data |
| Average Size | <1 KB (0 or 1 depending on how the storage controller uses this value) |
| Maximum Size | 2 KB (TBD against a sampling of standard syslog data) |
| Priority | Initially set to "3" (average) |
| Storage Access Model | Initially set to "3" (average) |
| Storage Controller Type | N/A (storage type is Temporary) |
| Storage Type | Temporary |
| Time Relevance | Initially set to 43,200 minutes (30 days) |
| Intrinsic Value | Initially set to "3" (average) |

The MessageLine datatype keys definition is shown below in Table 11.

TABLE 11

| Data Type Key Name | Description | Type | Unique Combiner | Value Source |
|---|---|---|---|---|
| MessageLine_ID | Uniquely identifies a line of syslog data | Long | Yes | Generated by Syslog Parser |
| hostid | hostid of the system that | String | No | hostid key of messages |

TABLE 11-continued

| Data Type Key Name | Description | Type | Unique Combiner | Value Source |
|---|---|---|---|---|
| | the message came from | | | file data type |
| timestamp | time the syslog message was generated (GMT) | Date | No | the syslog line |
| sourceProcess | process that generated the message as noted in the messages file | String | No | the syslog line |
| syslogLevel | the logging level that logged this message | String | No | the syslog line (empty String if not present) |
| message | the text of the message | String | No | the syslog line |
| previous | MessageLine_ID of the previous syslog message | Long | No | Generated by Syslog Parser |
| next | MessageLine_ID of the next syslog message | Long | No | Generated by Syslog Parser |

The MessageLine runtime properties definition is shown below in Table 12.

TABLE 12

| Runtime Property Name | Description | Type | Value Source |
|---|---|---|---|
| hostname | the hostname given in this message | String | the syslog line |
| pid | the pid of the process that generated this message | Integer | the syslog line (-1 if not present) |
| syslogID | the syslog generated ID of this message | Long | the syslog line (-1 if not present) |
| repeated | Number of times this message was immediately repeated | Integer | the next line of the messages file |

During processing, the Syslog Parser receives the message files from the external data input manager via subscription. It opens the body of the message and reads through the messages line by line. A line is formatted into a MessagesLine data type if:

the hostname on the line matches the hostname provided in the file as the hostname of the system, and the message line matches criteria for publishing.

Matching the hostname on the message line with the system hostname filters messages generated by other systems at the customer site and routed to this system. The criteria for publishing is configured by the user setting up the client prior to starting up the Syslog Parser. It consists of a series of regular expressions that are matched against the datatype keys or runtime properties of MessagesLine to allow the SyslogLine to be published.

Publishing the MessageLine instances that are generated is delayed until the entire messages file received has been processed. This way Syslog Parser can insert the "links" between MessagesLine instances for the "previous" and "next" MessagesLine.

Therefore, methods, systems, and articles of manufacture consistent with the present invention provide for the distributed data-centric capture, sharing and managing of intellectual capital. Unlike conventional systems that synchronously provide data from static "stovepipe" data stores, the system presented herein enables the asynchronous sharing of structured and unstructured knowledge using a publish and subscribe pattern. Loosely coupled intellectual capital processing engines subscribe to the datatypes, execute processing based on the data, and publish processing results as datatypes. These processing results can be used to dynamically and asynchronously solve customer problems.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. The invention may be implemented with both object-oriented and non-object-oriented programming systems. The scope of the invention is defined by the claims and their equivalents.

What is claimed is:

1. A method in a data processing system having a program, the method comprising the steps of:

a subscriber subscribing to a datatype, the datatype having a predetermined runtime property that restricts use of the datatype, the datatype being associated with a data referenced in the datatype and maintained separate from the datatype;

asynchronously receiving the datatype responsive to the subscription;

determining whether the runtime properties are valid;

if the runtime properties are valid, determining whether a user of the subscriber has permission to access the data referenced in the datatype; and if the user has permission to access the data, providing the user access to the data.

2. The method of claim 1, wherein the runtime property is stored in a metadata of the datatype.

3. The method of claim 1, wherein the runtime property relates to the data.

4. The method of claim 1, wherein the step of determining whether the user has permission to access the data comprises determining whether the user is a registered user.

5. A computer-readable medium containing instructions that cause a program in a data processing medium to perform a method comprising the steps of:

a subscriber subscribing to a datatype, the datatype having a predetermined runtime property that restricts use of the datatype, the datatype being associated with a data referenced in the datatype and maintained separate from the datatype;

asynchronously receiving the datatype responsive to the subscription;

determining whether the runtime properties are valid;

if the runtime properties are valid, determining whether a user of the subscriber has permission to access the data referenced in the datatype; and if the user has permission to access the data, providing the user access to the data.

6. The computer-readable medium of claim 5, wherein the runtime property is stored in a metadata of the datatype.

7. The computer-readable medium of claim 5, wherein the runtime property relates to the data.

8. The computer-readable medium of claim 5, wherein the step of determining whether the user has permission to access the data comprises determining whether the user is a registered user.

9. A data processing system comprising:
a memory having a program that subscribes a subscriber to a datatype, the datatype having a predetermined runtime property that restricts use of the datatype, the datatype being associated with a data referenced in the datatype and maintained separate from the datatype, asynchronously receiving the datatype responsive to the subscription, determines whether the runtime properties are valid, determines whether a user of the subscriber has permission to access the data referenced in the datatype if the runtime properties are valid, and provides the user access to the data if the user has permission to access the data; and
a processing unit that runs the program.

10. A data processing system comprising:
means for subscribing a subscriber to a datatype, the datatype having a predetermined runtime property that restricts use of the datatype, the datatype being associated with a data referenced in the datatype and maintained separate from the datatype;
means for asynchronously receiving the datatype responsive to the subscription;
means for determining whether the runtime properties are valid;
means for determining whether a user of the subscriber has permission to access the data referenced in the datatype if the runtime properties are valid; and
means for providing the user access to the data if the user has permission to access the data.

* * * * *